(12) United States Patent
Sakaguchi

(10) Patent No.: US 6,563,962 B1
(45) Date of Patent: May 13, 2003

(54) IMAGE READING APPARATUS AND IMAGE FORMATION SYSTEM

(75) Inventor: Yasunobu Sakaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/372,279

(22) Filed: Aug. 11, 1999

(30) Foreign Application Priority Data

Aug. 17, 1998 (JP) ............................................ 10-230616

(51) Int. Cl.$^7$ ........................... G06K 9/32; G03B 27/52; H04N 1/46
(52) U.S. Cl. ........................... 382/298; 355/55; 358/528
(58) Field of Search .......................... 382/298, 299, 382/305, 312; 355/40, 55, 56; 358/527, 528, 537, 1.2

(56) References Cited

U.S. PATENT DOCUMENTS 4,901,106 A * 2/1990 Yamamoto ................... 355/55
5,053,885 A * 10/1991 Telle ........................... 358/449
6,100,960 A * 8/2000 Sato et al. .................... 355/40
6,342,957 B1 * 1/2002 Itoh ............................ 358/527

* cited by examiner

Primary Examiner—Bhavesh M. Mehta
Assistant Examiner—Kanji Patel
(74) Attorney, Agent, or Firm—Sughrue Mion, PLLC

(57) ABSTRACT

A verification screen is displayed using information obtained by a prescan, fine scan conditions are computed on the basis of the print magnification and whether or not the density of an image obtained by the prescan is higher than a predetermined value is determined, so as to determine whether or not it is necessary to move to high density reading mode. If it is not necessary to move to the high density reading mode, a fine scan is carried out according to the fine scan condition. If it is necessary to move to the high density reading mode, an image is read at a slow transporting speed and over a long accumulation time.

10 Claims, 23 Drawing Sheets

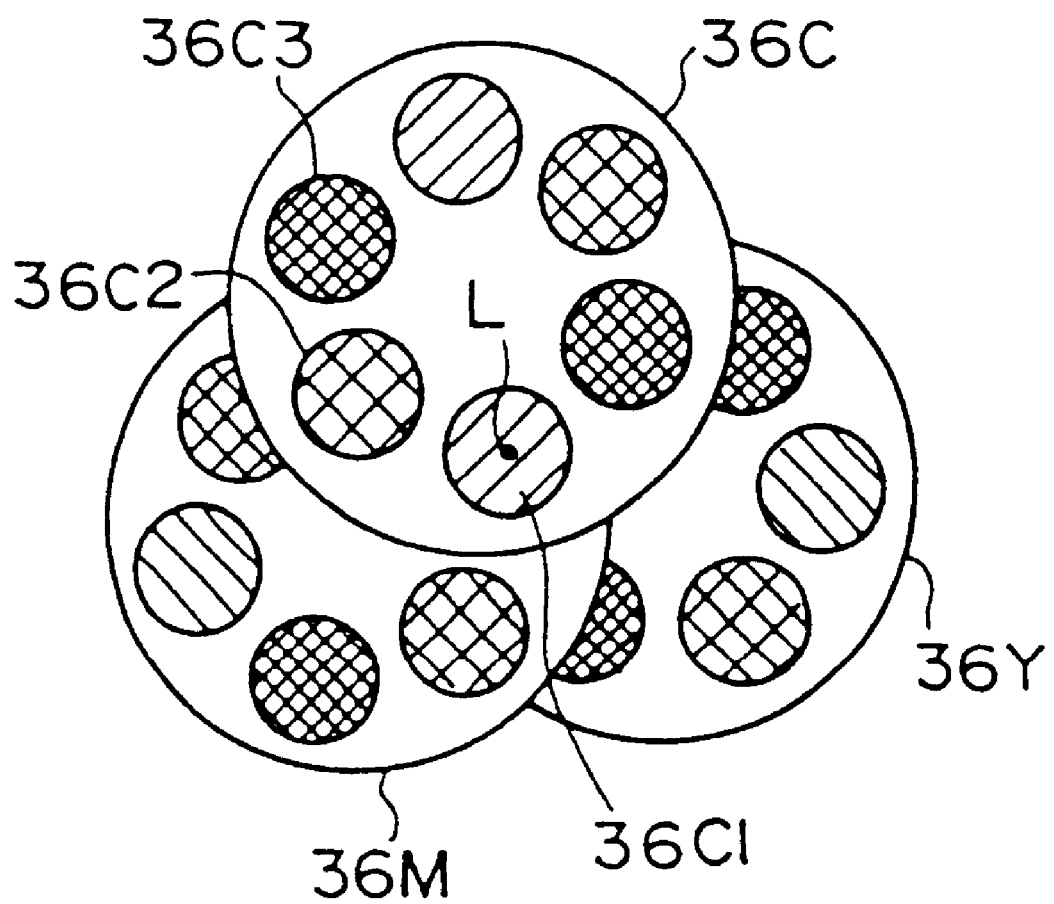

IMAGE READING APPARATUS AND IMAGE FORMATION SYSTEM

BACKGROUND OF THE INVENTION

1. Field of the Invention

The present invention relates to an image reading apparatus and an image forming system, and more particularly to an image reading apparatus for reading an image on a photographic photosensitive material in accordance with reading conditions for reading the image on the photographic photosensitive material and an image forming system having the image reading apparatus.

2. Description of the Related Art

Conventionally, an image reading apparatus has been proposed, in which a preliminary reading is performed on an image recorded on a photographic film, reading conditions for the main reading of the image are computed according to the information obtained by the preliminary reading, for example, the density of the image, and finally the main reading of the image is performed. Because this apparatus computes reading conditions based on the density or the like of the image, excellent reading conditions determined in accordance with the density and so on of the image can be computed.

However, in the above apparatus, the reading conditions are computed based on the density or the like of the image, but print magnification is not considered. Therefore, an appropriate optical magnification or an appropriate number of pixels in the image to be read cannot be established. That is, the above reading conditions are not the optimum conditions.

In the case where an image recorded on a photographic film is read, as described above, the image data is stored on a storage medium and the stored image data is used for various purposes such as the display thereof on a display unit. In this case, the quantity of image data which is determined by the size of the image, the resolution thereof, and the like is not considered. Therefore, an appropriate optical magnification or reading pixel number corresponding to the image data quantity cannot be set up. That is, the above reading conditions are not the optimum reading conditions.

SUMMARY OF THE INVENTION

The present invention has been achieved in view of the above problem, and therefore it is an object of the present invention to provide an image reading apparatus capable of reading an image recorded on a photographic photosensitive material under optimum reading conditions and an image forming system equipped with the image reading apparatus.

To achieve the above object, the first invention provides an image reading apparatus comprising: a setting device for setting a print magnification which is a ratio between the size of a portion to be read of an image recorded on a photographic photosensitive material and the size on a print surface of the read image; computing means for computing a reading condition for reading an image on the photographic photosensitive material on the basis of the print magnification set by the setting device; and a reading device for reading an image on the photographic photosensitive material in accordance with the reading condition computed by the computation means.

That is, the setting device sets a print magnification. The print magnification refers to a ratio between the size of a portion to be read of an image recorded on the photographic photosensitive material and the size on the print surface of the read image.

It is permissible for the image reading apparatus further comprise a detector for detecting the type of the photographic photosensitive material and an input device for inputting the size on the print surface, and for the setting device to set the print magnification on the basis to the type of photographic photosensitive material detected by the detector and the size on the print surface input by the input device.

This is embodied by the fact that if the type of photographic photosensitive material is known, the size of the portion to be read of an image recorded on the photographic photosensitive material is known in advance, and if the size on the print surface is recognized, the print magnification can be set up.

It is permissible for the image reading apparatus to further comprise a specifying device for specifying the size of a portion to be read of an image recorded on the photographic photosensitive material and an input device for inputting the size on the print surface and for the setting device to set the print magnification on the basis of the size of a portion to be read of the image specified by the specifying device and the size on the print surface input by the input device.

The specification of the size of a portion to be read equates to what is known as the trimming mode.

The above size-on the print surface may be input by selecting a desired size from a plurality of print surfaces.

The computing means computes a reading condition for a reading of an image on the photographic photosensitive material on the basis of a print magnification set by the setting device and the reading apparatus reads an image on the photographic photosensitive material in accordance with a reading condition computed by the computation means.

Because the reading condition for reading an image on the photographic photosensitive material is computed on the basis of the print magnification set in the above manner and the image on the photographic photosensitive material is read in accordance with the computed reading condition, the image on the photographic photosensitive material can be read on the basis of an appropriate reading condition corresponding to the print magnification.

It is permissible that the reading apparatus performs a preliminary reading and a fine reading on an image of the photographic photosensitive material and that the computing means computes a reading condition for a fine reading on an image of the photographic photosensitive material.

It is permissible that the image reading apparatus further comprises a transporting device for transporting the photographic film, and that the reading apparatus reads the image while the photographic photosensitive material is being transported by the transporting device.

Further, it is permissible that the image reading apparatus further comprises: determining means for determining whether or not reading by the reading apparatus is completed appropriately on the basis of the reading condition computed by the computing means; and an indicating device for indicating an error if it is determined that the reading by the reading apparatus is not completed appropriately by the determining means.

Further it is permissible that the computation means computes at least one of an optical magnification (in accordance with print magnification), a lens F value (in accordance with the optical magnification), reading pixel (a cut-out pixel number in accordance with an electronic scaling ratio obtained from the print magnification and optical magnification), accumulation time (a basic accumulation time in accordance with the optical magnification), subscanning speed (a basic subscanning speed in accordance with the print magnification and basic accumulation time), a reading cycle in accordance with the basic accumulation time and basic subscanning speed, irradiated light volume (a light source diaphragm value corresponding to an adjusted light amount obtained in accordance with the basic accumulation time, reading cycle, and the like, and an accumulation time in accordance with the reading cycle, light source diaphragm value) and the like.

The second invention comprises setting device for reading an image recorded on a photographic photosensitive material and setting an image data quantity estimated for storage in a storage device, determining means for determining a reading condition for reading an image on the photographic photosensitive material based on the image data quantity set up by the setting device, and reading device for reading the image on the photographic photosensitive material in accordance with a reading condition determined by the determining means.

Namely, the setting device reads an image recorded on a photographic photosensitive material and sets an estimated image data quantity for storing the image data in the storage device. The setting device sets the data quantity by, for example, setting the size of the portion to be read of an image and the resolution for when the image is displayed on a display device. The aforementioned image data quantity may be the image data quantity when the image data is compressed and stored or the image data quantity when the image data is reduced by at least one reduction ratio or enlarged by at least one enlargement ratio.

The determining means determines a reading condition for reading an image on the photographic photosensitive material based on the image data quantity set by the setting means. Then, the reading means reads an image on the photographic photosensitive material in accordance with the reading condition determined by the determining means.

Because the reading condition is determined based on the estimated image data quantity for reading an image recorded on the photographic photosensitive material and storing the image in the storage device, the reading condition can be optimized so that the image can be read optimally.

BRIEF DESCRIPTION OF THE DRAWINGS

FIG. 18 is an explanatory diagram explaining a region to be scanned which is altered depending on trimming or the like.

FIG. 26 is a diagram showing an example of modification of the turret.

DESCRIPTION OF THE PREFERRED EMBODIMENTS

Hereinafter, the embodiment of the present invention will be described in detail with reference to the accompanying drawings.

Figure 1:
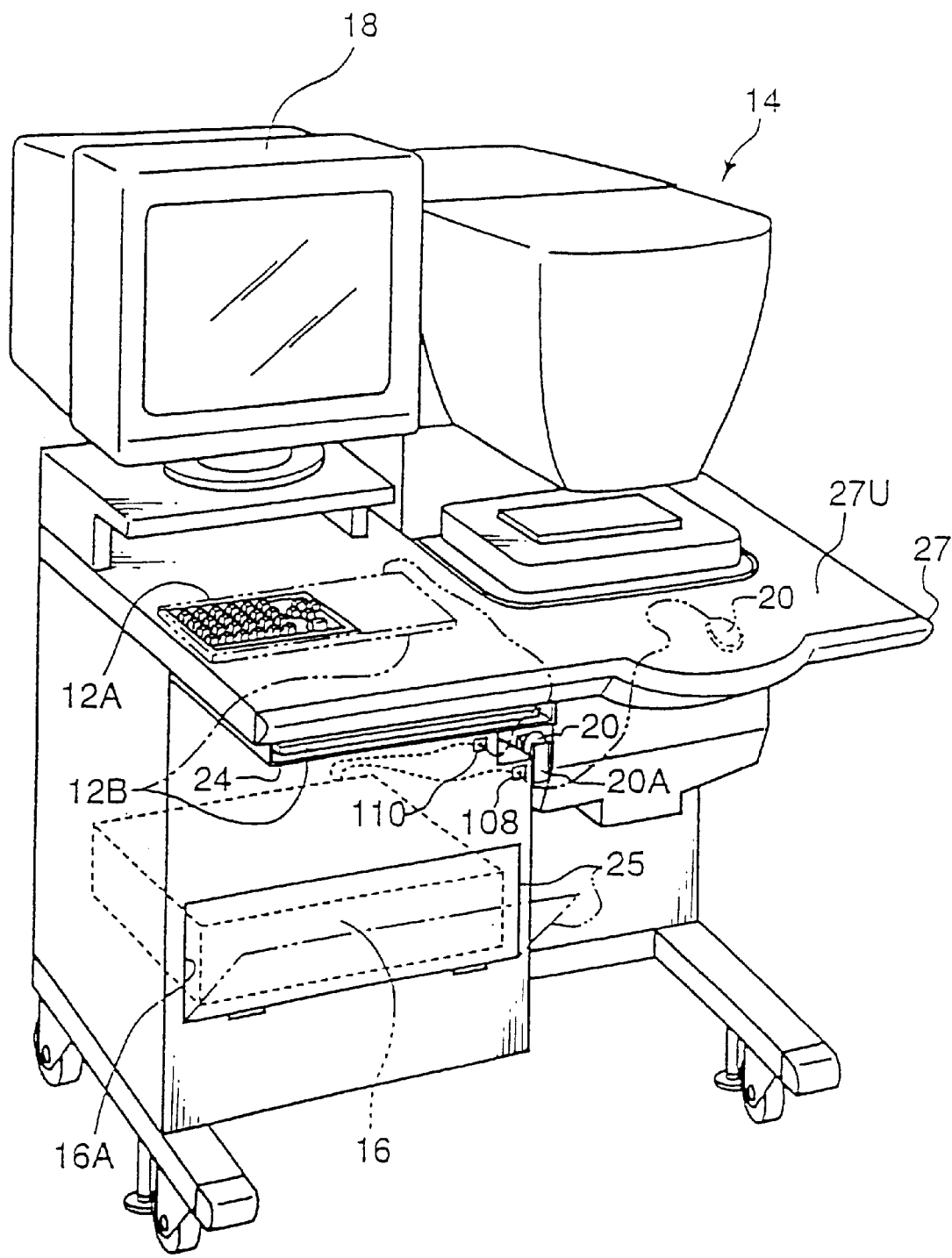
FIG. 1 is an exterior drawing of a line CCD scanner.

As shown in FIG. 1, the line CCD scanner 14 (the image reading apparatus) according to this embodiment comprises an image processing section 16, a mouse 20, two types of keyboards 12A and 12B and a display 18, which are provided on a work table 27.

One keyboard 12A is buried in the work surface 27U of the work table 27. The other keyboard 12B is accommodated in a drawer 24 of the work table 27 when it is not used and upon use, it is brought out from the drawer 24 and laid on top of the keyboard 12A. At this time, the cord of the keyboard 12B is connected to a jack 110 of the image processing section 16.

A cord of the mouse 20 is connected to the image processing section 16 through a hole 108 provided on the work table 27. The mouse 20 is accommodated in a mouse holder 20A when not used and upon use, it is brought out from the mouse holder 20A and placed on the work surface 27U.

The image processing section 16 is accommodated in an accommodating portion 16A provided on the work table 27 and closed with a door 25. By opening this door 25, the image processing section 16 can be brought out.

The line CCD scanner 14 reads a film image recorded on a photographic film such as a negative film or a reversal film, for example, a 135 size photographic film, a 110 size photographic film, a photographic film in which a transparent magnetic layer is formed (a 240 size photographic film: known as an APS film), a 120 size and a 220 size (brownie size) photographic film. The line CCD scanner 14 reads the above film image to be read by means of a line CCD and outputs image data.

The term "photographic film" used here refers to a film on which an object is photographed, developing processing is performed, and a negative or positive image is visualized.

Image data outputted from the line CCD scanner 14 is inputted to the image processing section 16 and various image processings such as various types of correction are carried out on the inputted image data and that processed data is outputted to a laser printer (not shown) as recording image data.

Figure 2:
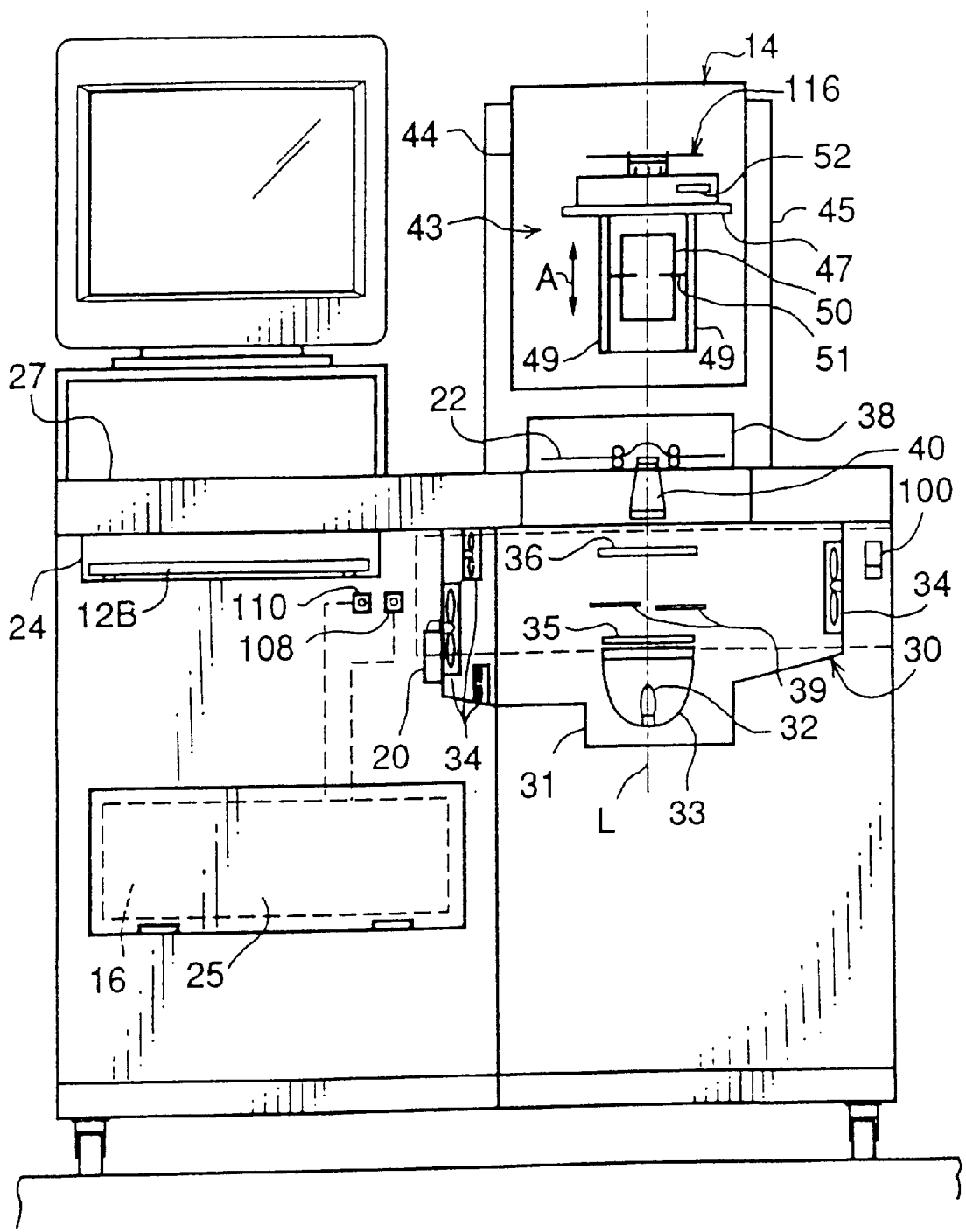
FIG. 2 is a front sectional view of optical system of the line CCD scanner.
Figure 3:
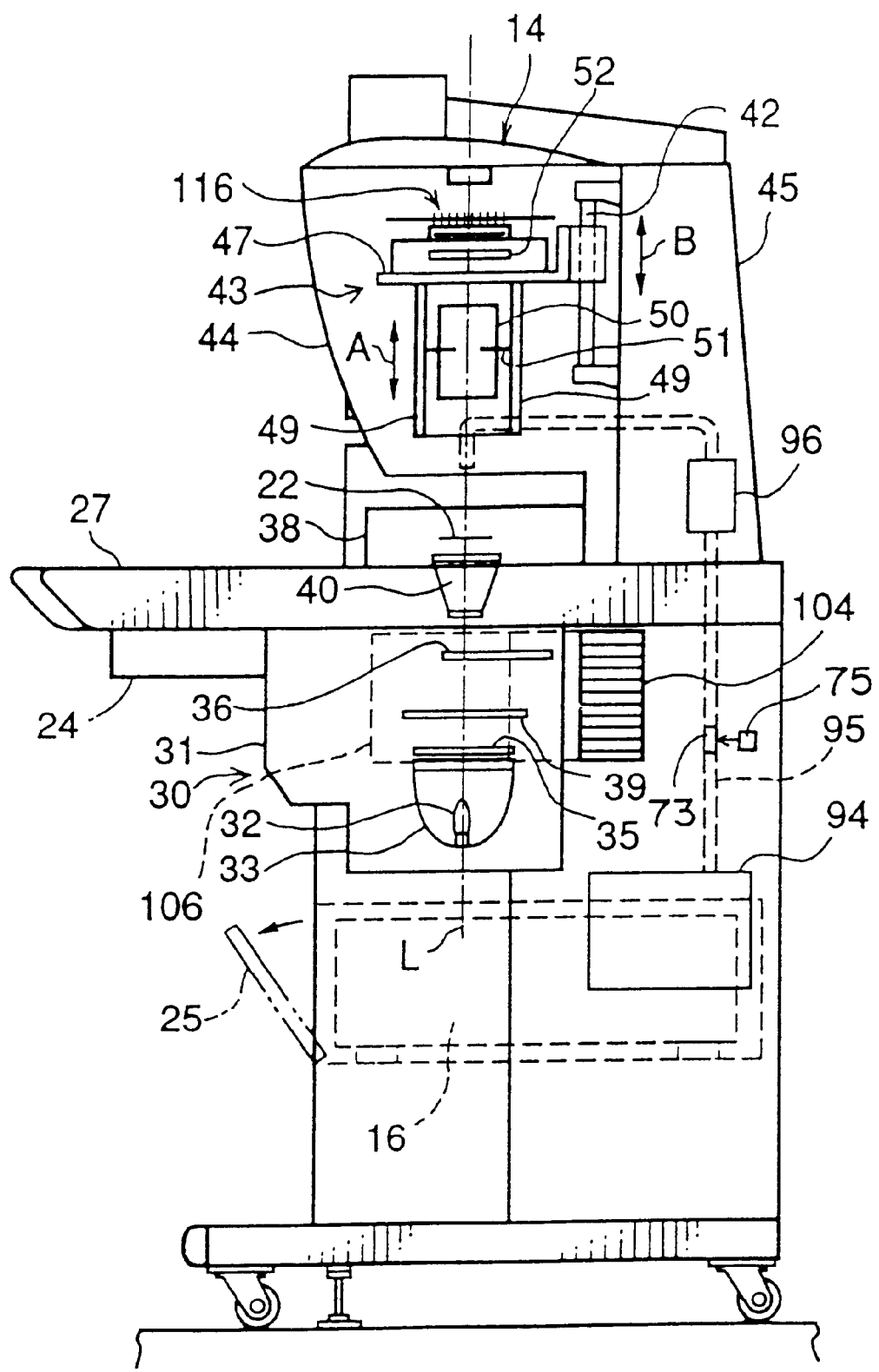
FIG. 3 is a side sectional view of the optical system of the line CCD scanner.

As shown in FIGS. 2 and 3, the optical system of the line CCD scanner 14 comprises a light source 30 disposed below the work table 27, a diffusion box 40 supported by the work table 27, a film carrier 38 set on the work table 27 and a reading section 43 disposed on the opposite side of the work table 27 to the light source 30.

The light source 30 is accommodated in a casing 31 made of metal and in the casing 31, a lamp 32 composed of a halogen lamp, a metal halide lamp or the like is disposed.

A reflector 33 is disposed around the lamp 32 so that part of light emitted from the lamp 32 is reflected by the reflector 33 and emitted in a predetermined direction. A plurality of fans 34 are provided at the side of the reflector 33. The fans 34 are activated while the lamp 32 is lit so as to prevent the interior of the casing 31 from being overheated.

On the side of the reflector 33 from which the light is emitted, a UV/IR cut filter 35 for cutting light of ultraviolet and infrared wavelength so as to prevent a rise of temperature in the photographic film 22 thereby improving reading accuracy, a diaphragm 39 for adjusting the amount of light from the lamp 32 and the amount of light emitted from the reflector 33, and a turret 36 (see FIG. 4B also) including a balance filter 36N for a negative film and a balance filter 36P for reversal film for setting appropriately color components of light arriving at the photographic film 22 and reading section 43 in accordance with the type of photographic film (negative film/reversal film).

Figure 4A:
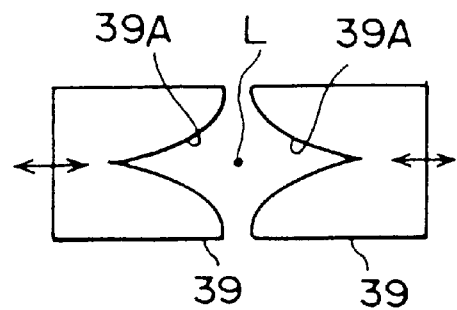
FIGS. 4A, 4B, 4C and 4D are plan views indicating respectively an example of a diaphragm, a turret, a lens diaphragm, and a CCD shutter.

The diaphragm 39 is composed of a pair of plate materials (diaphragm plate) disposed on either side of an optical axis L and structured so that the pair of plate materials are able to slide towards and away from each other. As is shown in FIG. 4A, a cutout portion 39A is formed on one each of each of the pair of plate materials of the diaphragm 39. The surface area of each cutout portion in a direction orthogonal to the sliding direction changes going from one of each diaphragm plate to the other end of the diaphragm plate in the sliding direction of the plate. The pair of plate materials of the diaphragm 39 are disposed so that the cutout portions 39A are facing each other.

In the above structure, one of the filters (36N or 36P) depending on the type of photographic film is positioned on the optical axis L so as to obtain a desired color component and the light passing the diaphragm 39 is adjusted to a desired light amount depending on the position of the diaphragm 39.

The diffusion box is shaped so that the width thereof in the direction of transportation of the photographic film which is transported by the film carrier 38 decreases the closer to the top, namely the closer to the photographic 22 (see FIG. 2), and the width thereof in the direction orthogonal to the direction of transportation of the photographic film 22 (namely, the widthwise direction of the photographic film 22) increases the closer to the top, namely the closer to the photographic film 22 (see FIG. 3). A light diffusion plate (not shown) is attached to each of the light incident side and light emission side of the diffusion box 40. Although the above-mentioned diffusion box 40 is intended for the 135 size photographic film, other diffusion boxes (not shown) corresponding to other photographic films are available.

Light irradiated into the diffusion box 40 is converted to a slit beam directed at the film carrier 38 (toward the photographic film 22) with the widthwise direction of the photographic film 22 being the longitudinal direction of the slit beam. Further, this light is converted to diffused light by the light diffusion plate and emitted from the diffusion box 40. Because the light emitted from the diffusion box 40 is diffused, unevenness in the amount of light irradiated onto the photographic film 22 is decreased so that a uniform amount of slit light is irradiated onto a film image. For this reason, even if there is a flaw on the film image, this flaw becomes difficult to notice.

A film carrier 38 and diffusion box 40 are prepared for each type of photographic film 22 and are selected in accordance with the type of photographic film 22.

Long, narrow openings (not shown), whose length is longer than the width of the photographic film 22 in the widthwise direction of the photographic film, are provided in both the top and bottom surfaces of the film carrier 38 at a position thereof intersecting the light axis L. The slit beam from the diffusion box 40 is irradiated onto the photographic film 22 through the opening provided on the bottom face of the film carrier 38, and light passing through the photographic film 22 arrives at the reading section 43 through the opening provided on the upper face of the film carrier 38.

The film carrier 38 has a guide(not shown) for guiding the photographic film 22 so that the photographic film 22 is curved at the position (reading position) irradiated with the slit beam from the diffusion box 40. As a result, flatness of the photographic film 22 is assured at the reading position.

The diffusion box 40 is supported so that the upper face thereof is adjacent to the above reading position. Therefore, the bottom face of the film carrier 38 is provided with a cutout portion so as to avoid interference between the film carrier 38 and the diffusion box 40 when a film is loaded in the film carrier 38.

The film carrier is so structured as to be capable of transporting the photographic film 22 during pre-scan or fine scan at a plurality of speeds depending on the density or the like of the film image to be fine scanned.

The reading section 43 is accommodated in the casing 44. Within the casing 44 is provided a mounting base 47 having a line CCD 116 mounted on the upper face thereof, and a plurality of supporting rails 49 droop from the mounting base 47. A lens unit 50 is supported by the supporting rail 49 so as to be able to slide towards or away from the work table 27 to reduce or enlarge the magnification. A supporting frame 45 is placed on the work table 27. The mounting base 47 is supported by the guide rail 42 mounted on the supporting frame 45 so as to be able to slide in a direction B towards or away from the work table 27 so as to assure a conjugate length for the above magnification change or for auto focusing. The lens unit 50 contains a plurality of lenses and a lens diaphragm 51 is provided in the middle of the plurality of the lenses. As shown in FIG. 4C, the lens diaphragm 51 has a plurality of diaphragm plates 51A substantially in the form of a letter C. The respective diaphragm plates 51A are disposed equally around the optical axis L and an end portion of each thereof is axially supported by a pin so that it is rotatable around the pin. The plurality of diaphragm plates 51A are linked with each other via a link (not shown), so that if a driving force is transmitted from a lens diaphragm driving motor (described later), the diagram plates 51A are rotated in the same direction. With the rotation of the diaphragm plates 51A, the area of a portion (FIG. 4C) not shaded by the diaphragm plates 51A around the optical axis L changes so that the amount of light passing through the lens diaphragm 51 changes.

In the line CCD 116, a plurality of photoelectric conversion devices such as CCD cells and photo diodes are disposed in a row in a the widthwise direction of the photographic film 22 and three lines of sensing portions containing an electronic shutter mechanism are spaced part in parallel to each other. A color separation filter for red, green and blue is provided on the side of each sensing portion (irradiated by the light) (known as a 3-line color CCD) A transmission portion composed of a plurality of CCD cells is provided in the vicinity of each sensing portion corresponding to each sensing portion and electric charges accumulated in each CCD cell of each sensing portion are transmitted in sequence through the corresponding transmission portion.

A CCD shutter 52 is provided on the incident light side of the line CCD 116. As shown in FIG. 4D, an ND filter 52ND is inserted in this CCD shutter 52. The CCD shutter 52 is rotated in the direction of an arrow u and changed to any state selected from fully closed state (a portion 52B and the like in which the ND filter 52ND is not engaged is positioned at a position 52C including the optical axis L) for intercepting light impinging upon the line CCD 116 for darkness correction, fully-open state (position of FIG. 4D) for allowing light to impinge upon the line CCD 116 for ordinary reading or lightness correction, and lightness reducing state (the ND filter 52ND is positioned at the position 52C) for reducing light impinging upon the line CCD 116 for linearity correction by means of the ND filter 52ND.

As shown in FIG. 3, a compressor 94 for generating cooling air for cooling the photographic film 22 is disposed on the working table 27. The cooling air generated by a compressor 94 is introduced by a guide tube 95 to a reading section (not shown) of the film carrier 38 and supplied thereto. Consequently, a region located at the reading section for the photographic film 52 is cooled. Meanwhile, the guide tube 95 passes through a flow rate sensor 96 for detecting a flow rate of the cooling air. The sensor for use here is not restricted to the flow rate sensor, but may be a sensor for detecting the velocity of the cooling air or a pressure sensor for detecting a pressure.

Figure 5:
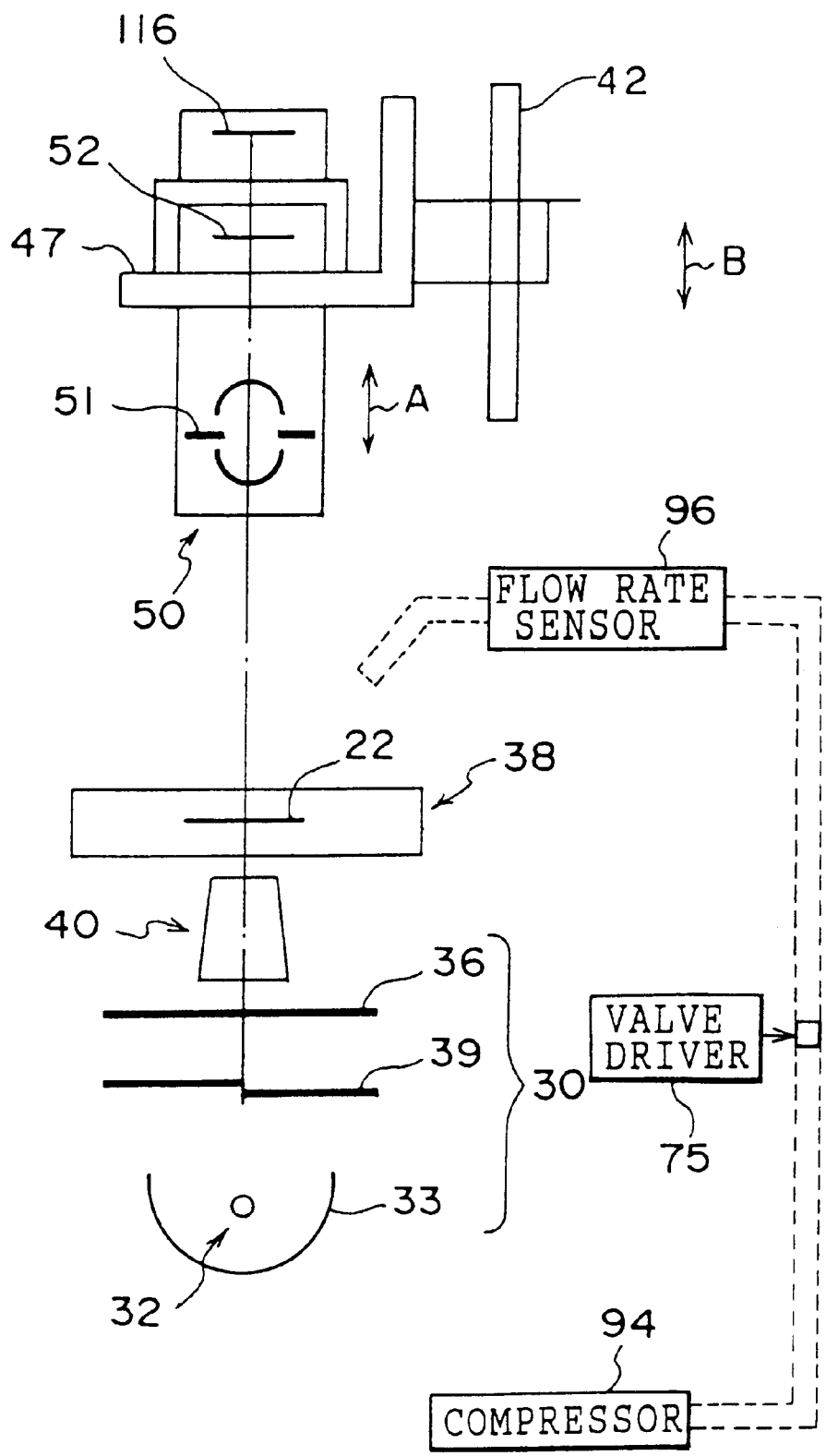
FIG. 5 is a diagram showing only the main portion of the optical system of the line CCD scanner.
Figure 6:
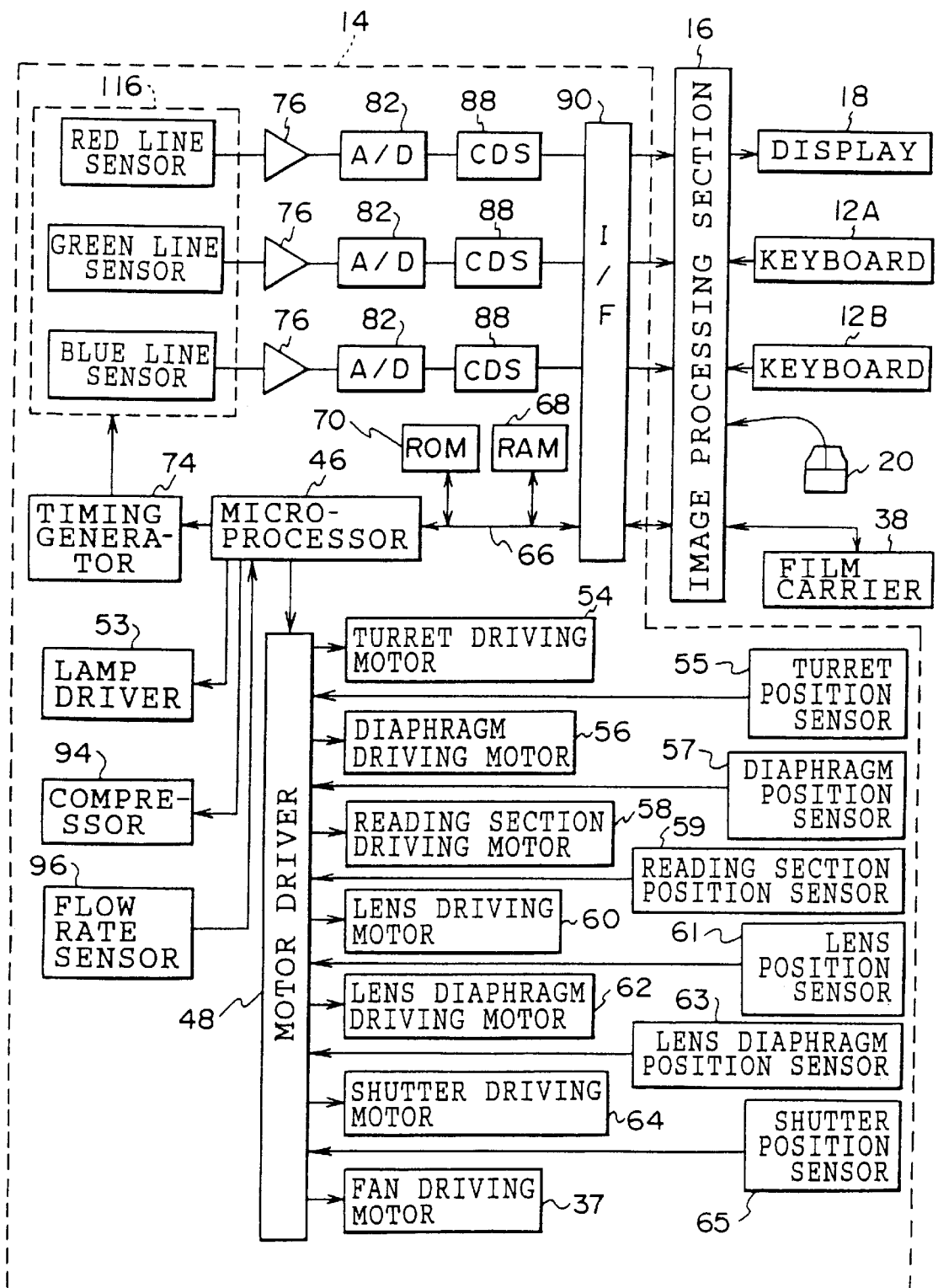
FIG. 6 is a block diagram showing the schematic structure of the electrical system of the line CCD scanner.

Next, a schematic structure of electric system of the line CCD scanner 14 and image processing section 16 will be described with reference to main portion of the optical system of the line CCD scanner 14 shown in FIG. 5, about FIG. 6.

The line CCD scanner 14 has a micro processor 46 for controlling the entire system of the line CCD scanner 14. A RAM 68 (for example, SRAM) and ROM 70 (for example, ROM whose storage content can be rewritten) are connected the micro processor 46 through a bus 66, and a lamp driver 53, a compressor 94, a flow rate sensor 96, and a motor driver 48 are connected thereto. The lamp driver 53 turns on/off the lamp 32 corresponding to an instruction from the microprocessor 46. The micro processor 46 operates the compressor 94 so as to supply cooling air to the photographic film 22 when a film image of the photographic film 22 is read. A flow rate of cooling air is detected by the flow rate sensor 96 so that the micro processor 46 detects abnormality.

Figure 4B:
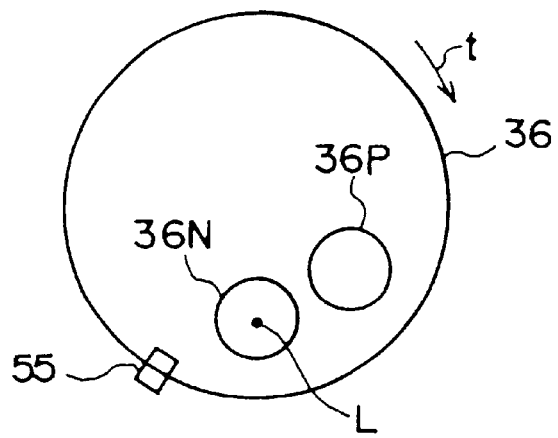
Figure 4C:
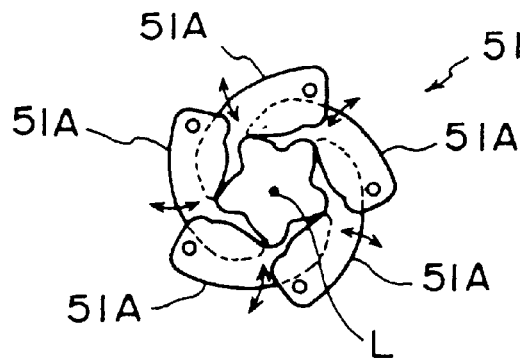
Figure 4D:
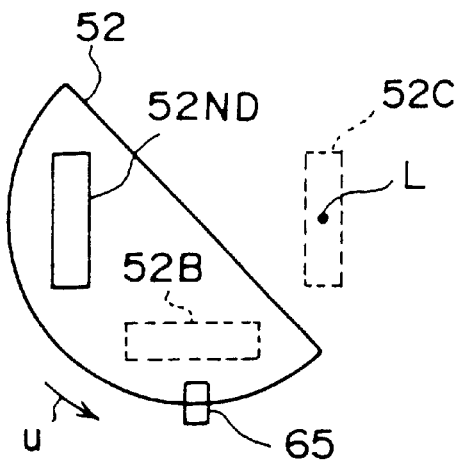

A turret driving motor 54 for driving a turret 36 in a direction of an arrow t of FIG. 4B so as to position any of a balance filter 36N for negative film and balance filter 36P for reversal filter of the turret 36 on the optical axis L and a turret position sensor 55 (see FIG. 4B) for detecting a reference position (cutout not shown) of the turret 36 are connected to the motor driver 48. Further, a diaphragm driving motor for sliding the diaphragm 39, a diaphragm position sensor 57 for detecting the position of the diaphragm 39, a reading section driving motor 58 for sliding a mounting base 47 (that is, line CCD 116 and lens unit 50) along a guide rail 42, a reading section position sensor 59 for detecting the position of the mounting base 47, a lens driving motor 60 for sliding the lens unit 50 along the supporting rail 49, a lens position sensor 61 for detecting the position of a lens unit 50, a lens diaphragm driving motor 62 for rotating the diaphragm plate 51A of the lens diaphragm 51, a lens diaphragm position sensor 63 fro detecting the position (position of the diaphragm 51A) of the lens diaphragm 51, a shutter driving motor 64 for changing the CCD shutter 52 to full closed state, full open state or darkening state, a shutter position sensor 65 for detecting the position of the shutter and a fan driving motor 37 for driving the fan 34 are connected to the motor driver 48.

When prescanning (preliminary reading) or fine scanning (full-scale reading) is carried out by the line CCD 116, the micro processor 46 drives the turret 36 by means of the turret driving motor 54 based on the positions of the turret 36 and diaphragm 39 to be detected by the turret position sensor 55 and diaphragm sensor 57 and the diaphragm 39 is slid by the diaphragm driving motor 56 so as to adjust light irradiated to the film image.

The micro processor 46 determines a zoom magnification depending on film image size and whether or not trimming is to be carried out and slides the mounting base 47 by means of the reading section driving motor 58 based on the position of the mounting base 47 to be detected by the reading section position sensor 59, so that the film image is read by the line CCD 116 at the determined zoom magnification. Further, the micro processor 46 moves the lens unit 50 by means of the lens driving motor 60 based on the position of the lens unit 50 to be detected by the lens position sensor 61.

When auto focus control is carried out so as to match a light receiving surface of the line CCD 116 with a film image focusing position by the lens unit 50, the micro processor 46 slides only the mounting base 47 by means of the reading section driving motor 58. Although this auto focus control can be carried out by maximizing the contrast of a film image to be read by the line CCD 116 (so-called image contrast method), it is permissible to provide a distance sensor for measuring a distance between the photographic film 22 and lens unit 50 (or line CCD 116) by infrared ray or the like and carry out this control based on a distance detected by the distance sensor instead of film image data.

On the other hand, a timing generator 74 is connected to the line CCD 116. The timing generator 74 generates various types of timing signals (clock signals) for actuating the line CCD 116, the A/D converter 82 which will be described, and the like. A signal output terminal of the line CCD 116 is connected to the A/D converter 82 through an amplifier 76 and a signal outputted from the line CCD 116 is amplified by the amplifier 76 and converted to digital data by the A/D converter 82.

An output terminal of the A/D converter 82 is connected to the image processing section 16 through a correlative dual sampling circuit (CDS) 88 and an interface (I/F) circuit 90. The CDS 88 samples feed through data indicating the level of feed through signal and pixel data indicating the level of pixel signal and subtracts feed through data from pixel data of each pixel. A result of computation (pixel data accurately corresponding to accumulated electric charge in each CCD cell) is outputted to the image processing section 16 in succession as scan image data through the I/F circuit 90.

Because reading signals of red, green and blue are outputted in parallel from the line CCD 116, three signal processing systems comprising the amplifier 76, A/D converter 82 and CDS 88 are provided and image data of red, green and blue are inputted to the image processing section 16 as scan image data from the I/F circuit 90.

Further, the aforementioned display 18, keyboards 12A, 12B, mouse 20 and film carrier 38 are connected to the image processing section 16.

Next, an operation of this embodiment will be described.

Figure 7:
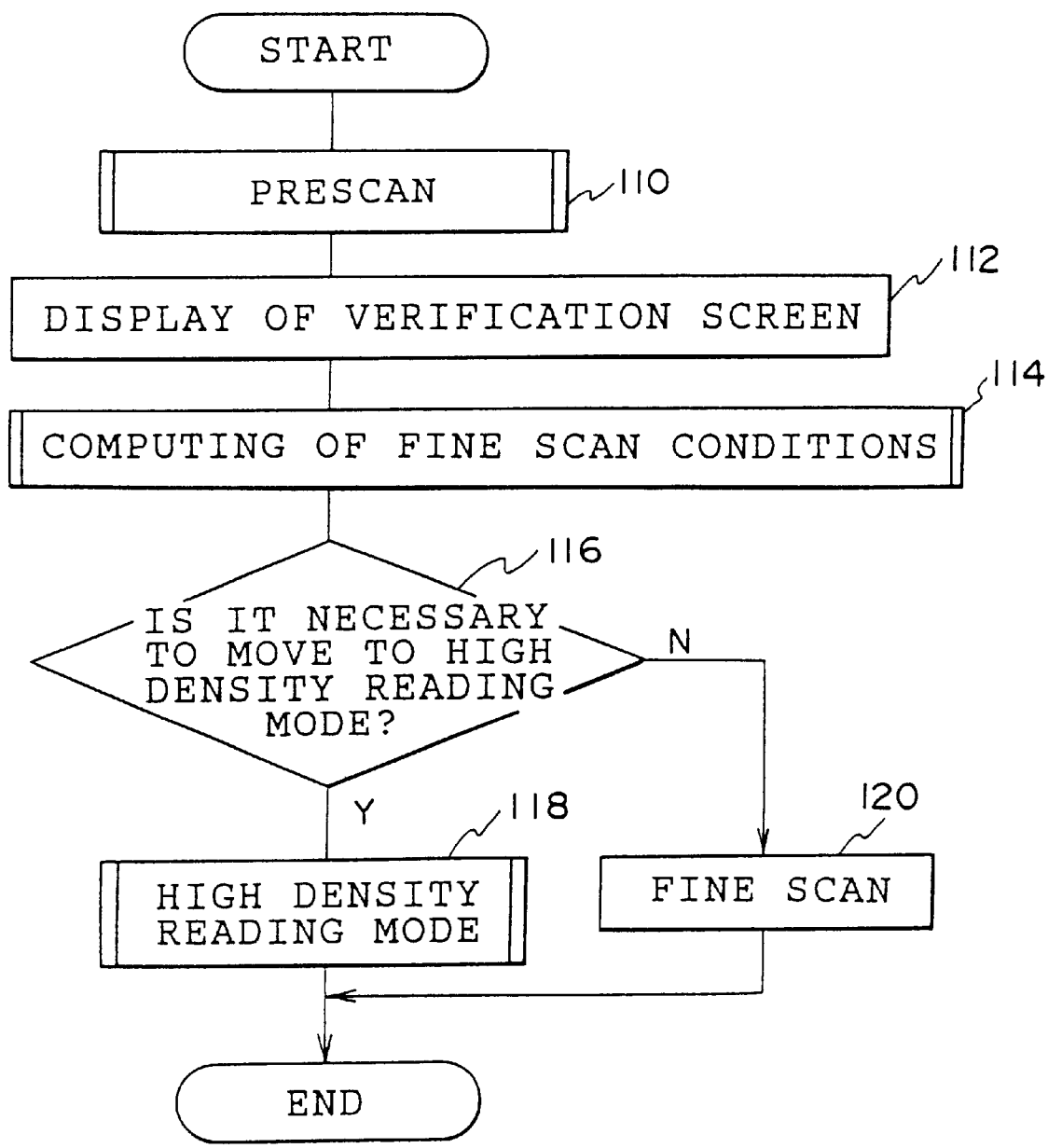
FIG. 7 is a flow chart showing a main control routine.

FIG. 7 shows a main control routine of the CCD scanner 14 according to this embodiment.

A plurality of print sizes and print types (whether or not there is a frame) are indicated on an initial screen of the display 18. An operator selects a desired print size and print type from a plurality of the print sizes indicated on the screen and loads the film carrier 38. If a photographic film 22 is inserted into the film carrier 38, a photographic film identifying sensor (not shown) in the film carrier 28 detects the photographic film 22 and the film carrier 38 automatically starts to transport the photographic film 22.

At the same time, the line CCD scanner 14 starts this main control routine, so that at step 110, respective portions are changed to the preliminary reading (thereinafter referred to as prescan) condition for obtaining an optimum exposure condition. Then, with the photographic film 22 being carried at a predetermined speed, prescan is carried out so as to read an image recorded on the photographic film 22.

Selection of the aforementioned print size and print type may be carried out when a verification screen which will be described later is displayed.

Figure 8:
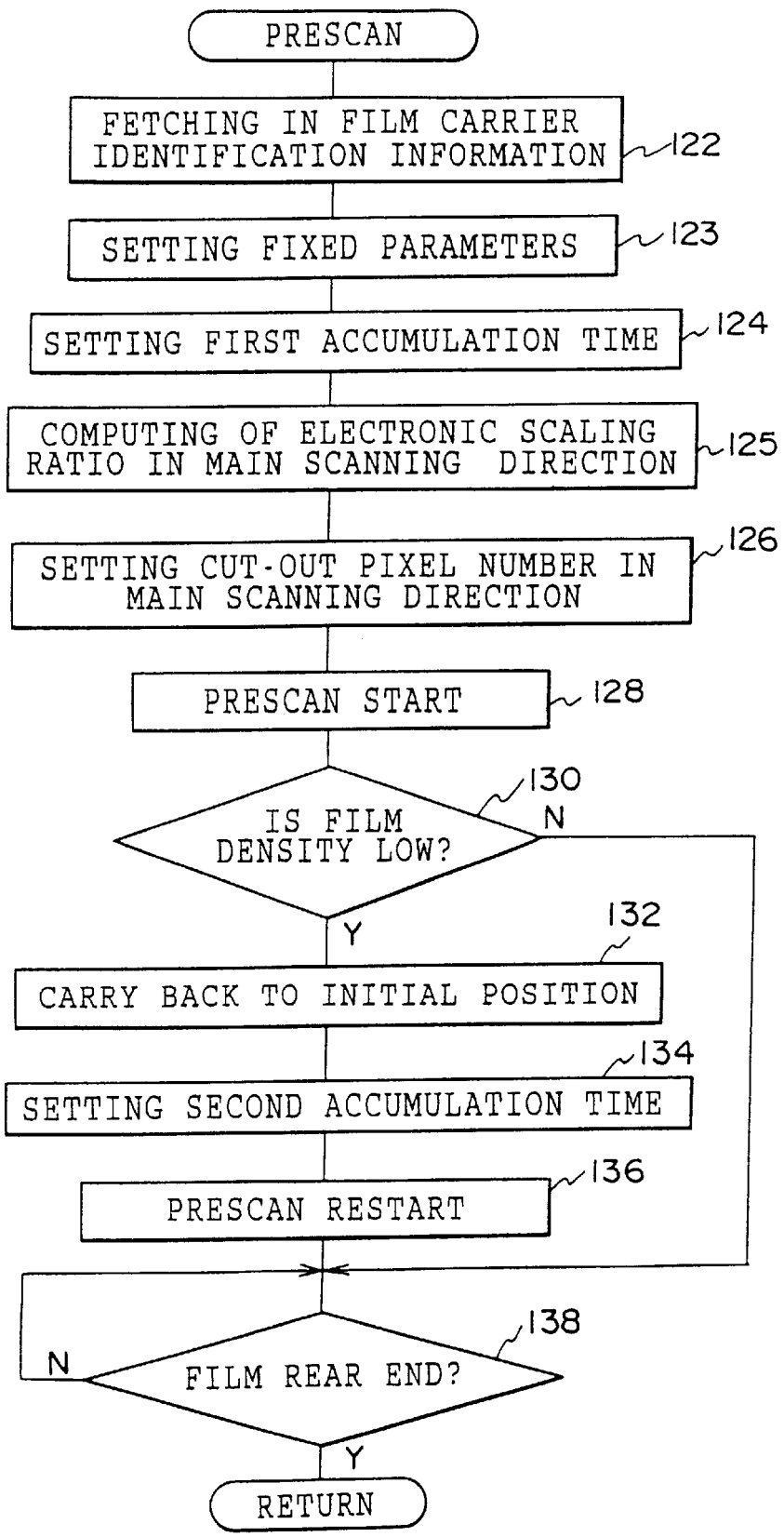
FIG. 8 is a flow chart showing a prescan processing routine.

Hereinafter, details of this prescan processing will be described by referring to the prescan processing routine shown in FIG. 8.

At step 122, film carrier identification information is fetched in. That is, if the film carrier 38 is loaded on the line CCD scanner 14, the film carrier identification signal is input from the film carrier 38 into the line CCD scanner 14. As a result, the line CCD scanner 14 memorizes information (film carrier identification information) for identifying the film carrier 38. This step intends to fetch in this stored film carrier identification information.

The film carrier 38 has various types, for example, 135AFC film carrier for carrying a 135 size photographic film, 240AFC film carrier for carrying a photographic film in which a transparent magnetic layer is formed (240 size photographic film: so-called APS film) and the like. The film carrier identification information is information for identifying what type a given film carrier 38 belongs to.

If the type of the film carrier 38 is identified, the size of a photographic film to be carried by that film carrier is determined.

At step 123, corresponding to the film carrier identification information (that is, film carrier type), fixed parameters such as a transporting speed, optical magnification, lens F value (lens F number), light source diaphragm and reading cycle are obtained and then set.

TABLE 1

|  | 135AFC | 240AFC |
| --- | --- | --- |
| Transporting speed (mm/sec) | 0.190 | 0.1585 |
| Optical magnification | 0.6 | 0.8 |
| Lens F value | 2.0 | 2.0 |
| Light source diaphragm | 0.0 (Fully open) | 0.0 (Fully open) |
| Reading cycle (msec/line) | 0.422 | 0.422 |

At step 124, a first accumulation time is set. For each of red, green and blue, the accumulation time is the above set reading cycle. B gain is 1 time.

Figure 12:
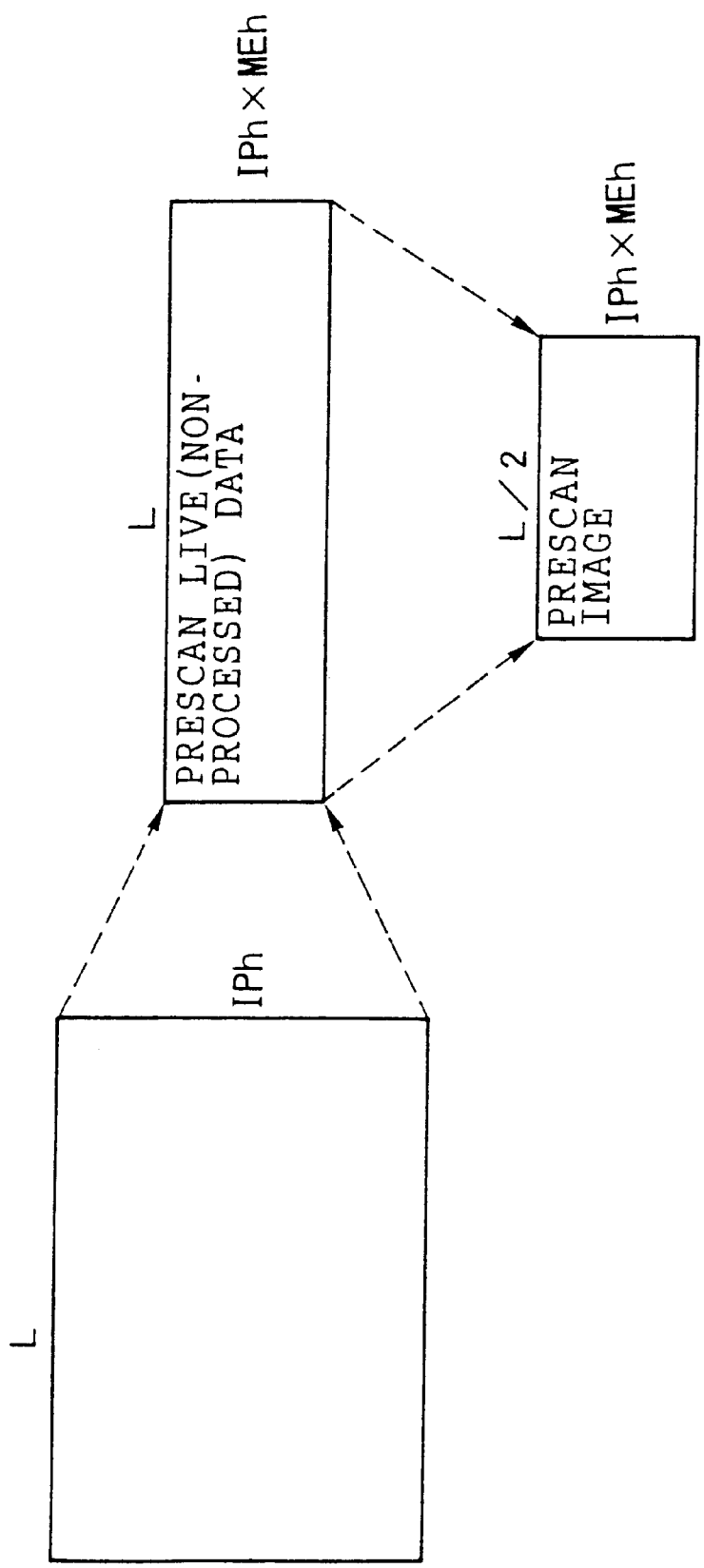
FIG. 12 is a conceptual view showing prescan image and prescan raw data.

At step 125, an electronic scaling ratio MEh in the main scanning direction is computed. As shown in FIG. 12, the number L of the prescan data is L=film length/film length necessary for reading once=film length/(transporting speed×reading cycle). On the other hand, the prescan image is obtained by selecting odd lines or even lines of prescan data lines. Thus, the number of lines in the prescan image is L/2. In the main scanning direction, an aspect ratio of the pixel in the prescan image is 1:1. That is, the number of pixels corresponding to a predetermined length on the film of the prescan image is $(\lambda/(\text{transporting speed} \times \text{reading time})) \times (1/2)$.

The number of pixels corresponding to the width of a film before electronic scaling is (film width)×(optical magnification)÷(pixel pitch).

The number of pixels corresponding to the film width after electronic scaling is (film width)÷(transporting speed)÷(reading cycle)÷2.

Therefore, the electronic scaling ratio MEh is,

MEh=(pixel pitch)÷(optical magnification)÷(transporting speed)÷2.

Here, in case of 135AFC,

MEh=(0.008)÷(0.6)÷(0.1900)÷(0.422)÷2=0.083 or in case of 240AFC,

MEh=(0.008)÷(0.8)÷(0.1585)÷(0.422)÷2=0.075.

At step 126, the cut-out pixel number in the main reading direction is set up. Here, the cut-out pixel number IPh in the main reading direction needs to be a pixel number having a region in which photographic film edges can be set in the prescan data and this is obtained in the following formula:

$$IPh = (\text{film width} + a) \times (\text{optical magnification}) \div (\text{pixel pitch})$$

where a must be larger than a sum of Table 2.

TABLE 2

| Factor | 135AFC | 240AFC |
| --- | --- | --- |
| Carrier opening dimensions allowance | 0.15 mm | 0.15 mm |
| Carrier production disparity (±0.2 mm) | 0.40 mm | 0.40 mm |
| Carrier mounting/removal disparity (±0.2 mm) | 0.40 mm | 0.40 mm |
| Optical axis disparity (= ±30 pixels × 0.008 ÷ optical magnification) | 0.80 mm | 0.60 mm |
| Electronic scaling resolution (= 1 pixel ÷ electronic scaling ratio × 0.008 ÷ optical magnification) | 0.17 mm | 0.14 mm |
| Total | 1.92 mm | 1.69 mm |

Here if a=2.0 mm is provided for both 135AFC and 240AFC, in case of 135AFC, $$MEh = (35+2) \times (0.6) \div (0.008) = 2775 \text{ and in case of 240AFC,}$$

$$MEh\ (24+2) \times (0.6) \div (0.008) = 1950.$$

At step 128, by controlling respective portions according to the above set condition, prescan is started. That is, the film carrier carries the photographic film at the aforementioned transporting speed. The reading section driving motor 58 is controlled so as to reach the aforementioned optical magnification. The lens driving motor 60 is controlled so as to obtain the above lens F value. The diaphragm driving motor 56 is controlled so as to obtain the aforementioned light source diaphragm. The CCD line sensor 116 reads at the above accumulation time.

At step 130, whether or the density of the photographic film is low is determined by determining whether or not the density of the photographic film is smaller than a predetermined value. If the density of the photographic film is not low, the processing proceeds to step 138. If the density of the photographic film is low, at step 132, the photographic film is returned to the initial position. At step 134, a second accumulation time is set up and at step 136, prescan is restarted.

Here, a second accumulation time is obtained as follows. The apparatus light amount (density) under the prescan condition obtained for bright correction is assumed to be Dpr, Dpg, Dpb. Further, the light amount allowance (density), Dar, Dag, Dab is obtained from Table 3.

TABLE 3

|  | Dar | Dag | Dab |
| --- | --- | --- | --- |
| 135AFC | 1.2 | 1.2 | 0.9 |
| 240AFC | 1.1 | 1.1 | 0.8 |

Further, from the diaphragm table obtained for the maintenance function, practical values Dvr, Dvg, Dvb of respective colors at light source diaphragm full opening position are obtained.

Then, the second accumulation time ET1 (msec) is obtained according to the apparatus light amount (density), light amount allowance (density) and practical values at the light source diaphragm full opening position:

$$ET1r = 0.422 \times (-\log(Dpr - Dar + Dvr))$$
$$ET1g = 0.422 \times (-\log(Dpg - Dag + Dvg))$$
$$ET1b = 0.422 \times (-\log(Dpb - Dab + Dvb))$$

where the B gain is 1 time.

At step 138, whether or not a rear end of the photographic film is detected is determined. If the rear end of the photographic film is detected, this routine is terminated. Consequently, the prescan is terminated.

Figure 13:
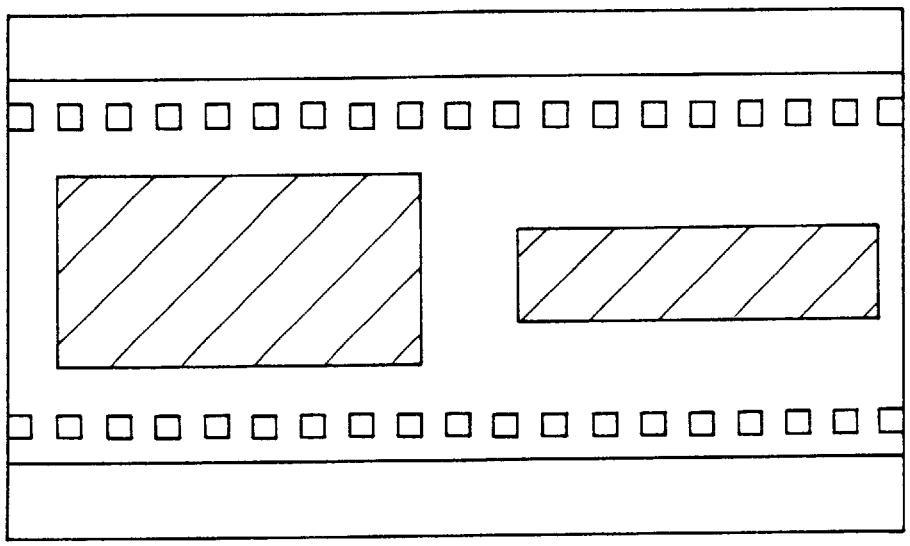
FIG. 13 is a conceptual view showing prescan data.

If the prescan is terminated, at step 112, a verification screen G (for example, positive image) indicating a finish state is displayed on the display 18 as shown in FIG. 13. In this verification screen G, a portion necessary cut from the prescan data is displayed and a region to be represented on the print is overlaid on the displayed necessary portion.

The image to be cut off from the prescan data is, for example, a region corresponding to sizes indicated in Table 4 on the photographic film. This region can be changed from viewpoints of operability.

TABLE 4

| Carrier type | Film size | Main scanning direction | Subscanning direction |
| --- | --- | --- | --- |
| 135AFC | 135F | 24.4 mm | 36.4 mm |
|  | 135P | 12.9 mm | 36.4 mm |
|  | 135H | 24.4 mm | 17.6 mm |
|  | 135HV | 19.8 mm | 36.4 mm |
| 240AFC | 240 | 16.7 mm | 30.2 mm |
| MFC | 110 | 12.9 mm | 17.0 mm |
|  | 126 | 28.0 mm | 28.5 mm |
|  | 6 × 4.5 | 56.0 mm | 41.5 mm |
|  | 6 × 6 | 56.0 mm | 56.0 mm |
|  | 6 × 7 | 56.0 mm | 69.0 mm |
|  | 6 × 8 | 56.0 mm | 75.0 mm |
|  | 6 × 9 | 56.0 mm | 82.6 mm |

On the prescan data, the number of pixels corresponding to a predetermined length λ on the film is λ/(transporting speed×reading cycle×2).

The size of a region to be printed on the photographic film is computed according to the print magnification.

[Case of Frameless Print]

Region to be printed (mm)=(print size/print magnification)

[Case of Print With Frame]

Region to be printed (mm)=((print size−frame)/print magnification)

The number of pixels corresponding to X (mm) on a print of an prescan image can be computed from (X/print magnification)×(transporting speed×reading cycle×2).

Then, a region to be printed is displayed using the above formula.

Here, the print magnification will be described. The print magnification refers to a ratio between the size of a portion to be read of an image recorded on the photographic film and the size of the read image on the print surface or a ratio of the image on the print surface with respect to the length of a standard scannable range.

Figure 14:
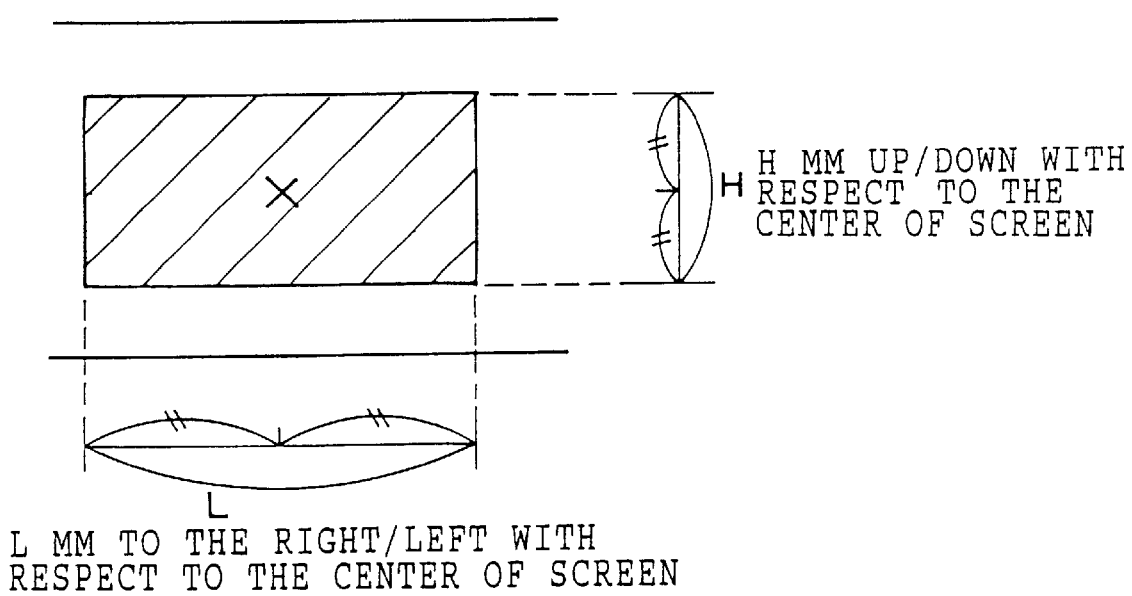
FIG. 14 is an explanatory diagram explaining a standard scannable range.

The standard scannable range (a portion from which a photographic film image is to be read) on the photographic film screen is regulated as shown in FIG. 14 corresponding to the aforementioned film carrier identification information.

As the standard scannable range on the photographic film surface, as for the main scanning direction, H mm with respect to the center of a screen in the main scanning direction and L mm with respect to the center of a screen in the subscanning direction are set up as shown in Table 5.

The center of the screen in the main scanning direction is a position determined from edges of the photographic film.

On the other hand, the center of the screen in the subscanning direction is a position obtained by screen detection (further, position fine-adjusted by the operator).

TABLE 5

| Carrier type | Film size | H | L |
|---|---|---|---|
| 135AFC | 135F | 23.6 | 34.8 |
|  | 135P | 12.9 | 34.8 |
|  | 135HV | 19.8 | 34.8 |
|  | 135H | 23.6 | 17.2 |
| 240AFC | 240 (C, H, P) | 16.3 | 29.8 |

Figure 15:
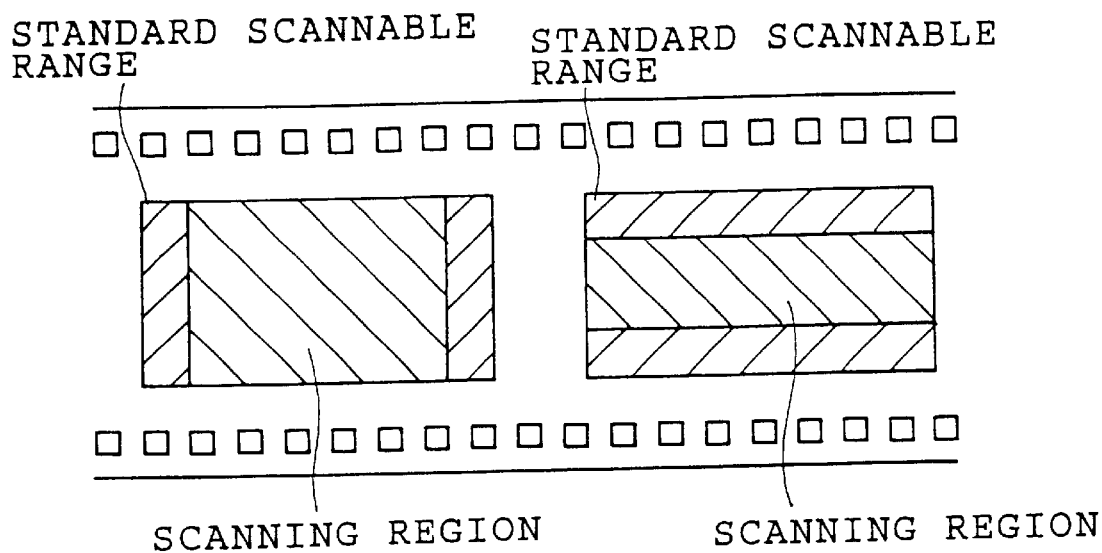
FIG. 15 is a diagram showing a relation between the standard scannable range and the scanned region.

As shown in FIG. 15, the standard print magnification utilizes a region to be scanned (size of a portion read of an image on the photographic film) on the photographic film to the maximum extend in a region not protruding from the standard scannable range.

Figure 16:
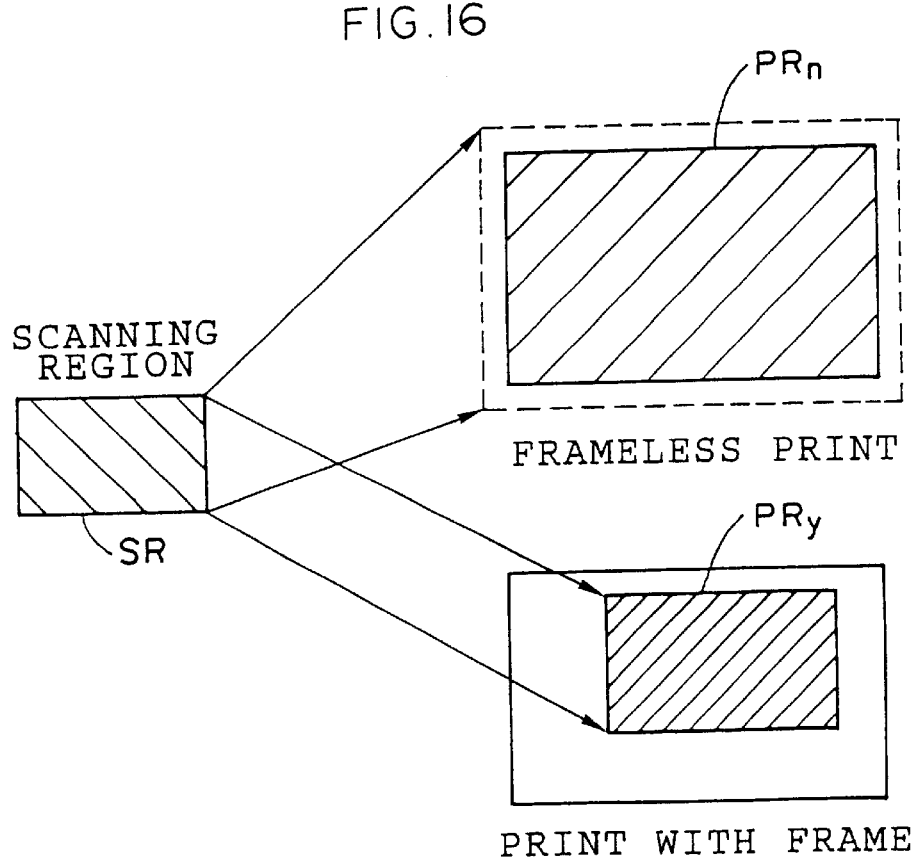
FIG. 16 is a diagram showing a frameless print and a frame provided print.
Figure 17:
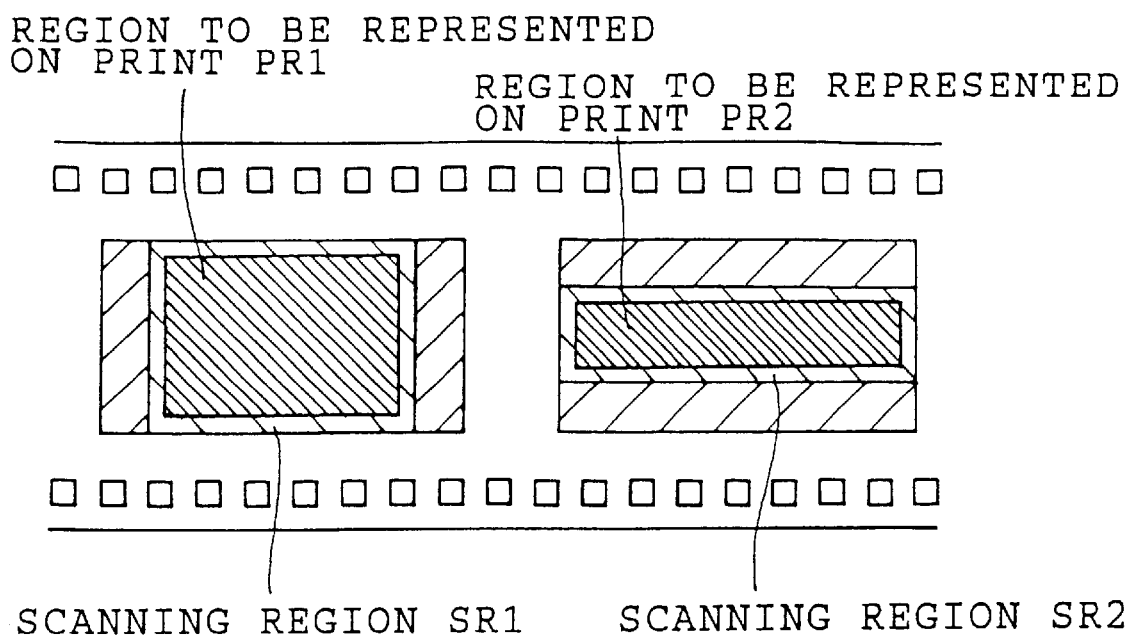
FIG. 17 is a diagram showing a region to be copied on a frameless print.

In case of frameless print, a scanning region is mapped so as to protrude slightly from the print surface (omitted portion occurs). Therefore, a region to be represented on print $PR_n$ is a region slightly smaller than the scanning region SR as shown in FIG. 16. Of the scanning region SR, a portion which is not the region to be represented on the print corresponds to the omitted portion. As shown in FIG. 17, a region to be represented on the print PR1 of an image on an ordinary photographic film is slightly smaller than the scanning region SR1 as shown in FIG. 16. Likewise, the region to be represented on the print PR2 of a panorama size image on the photographic film is slightly smaller than the scanning region SR2 as shown in FIG. 16.

In case of a print with frame, the scanning region is mapped directly in a region within the print frame. Thus, as shown in FIG. 16, the region to be represented on the print $PR_y$ is equal to the scanning region SR.

Then, the standard print magnification is computed as follow. The frameless print, the print with frame or the print size is determined with selecting by the operator as described above.

[Case of Frameless Print]
A larger value is selected from:

(long side length of print size+vignetting)/long side length of standard scannable range and (short side length of print size+vignetting)/short side length of standard scannable range.

[Case of Print With Frame]
A larger value is selected from:

long side length of print screen portion excluding frame/long side length of standard scannable range and short side length of print screen portion excluding frame/short side length of standard scannable range;

where it is assumed that the aforementioned vignetting occurs by processing in the printer portion. The print magnification is achieved according to optical magnification and electronic scaling ratio in the following formula.

print magnification=optical magnification×electronic scaling ratio×γ where γ=(output pixel size)/(input pixel size)
for example, γ=(25.4)/(300)×(1/0.008)=10.583.

The optical magnification is 0.6, 0.8, 1.0, 1.2 or 1.3 and the electronic scaling ratio can be set by the unit of 0.1% in a range of 3.1%–400.0%. Thus, the setting unit of the print magnification is 1.3×0.001×10.583=0.0138 maximum and 0.6×0.001×10.583=0.0063 minimum. The unit of the print magnification is 0.01 including the standard print magnification and a magnification set up by user for trimming.

The standard print magnification is computed when a new print size is registered. If a combination of the photographic film type and print size is an existing combination, the standard print magnification computed in the above manner and stored is used. Meanwhile, the standard print magnification can be changed by fine adjustment of user.

The operator verifies the verification screen G displayed on the display 18 and manually corrects the density, color and the like of an image if necessary, performs center trimming as required and specifies a reading image region.

The center trimming is a function capable of changing the print magnification freely. As a result, a scanning region is changed. This can be performed in an extent that a photographic film image is focused within a CCD sensor region. The trimming setting method is determined for enlargement/reduction, move, rotation and the like as follows. In case of enlargement/reduction, for example, two methods are available. A first method is by setting a trimming frame with the mouse or key and a second method is by inputting a print magnification value. In case of move, a trimming frame is moved with the mouse or key. In case of rotation, a rotation angle is operated with the mouse or key.

Figure 18:
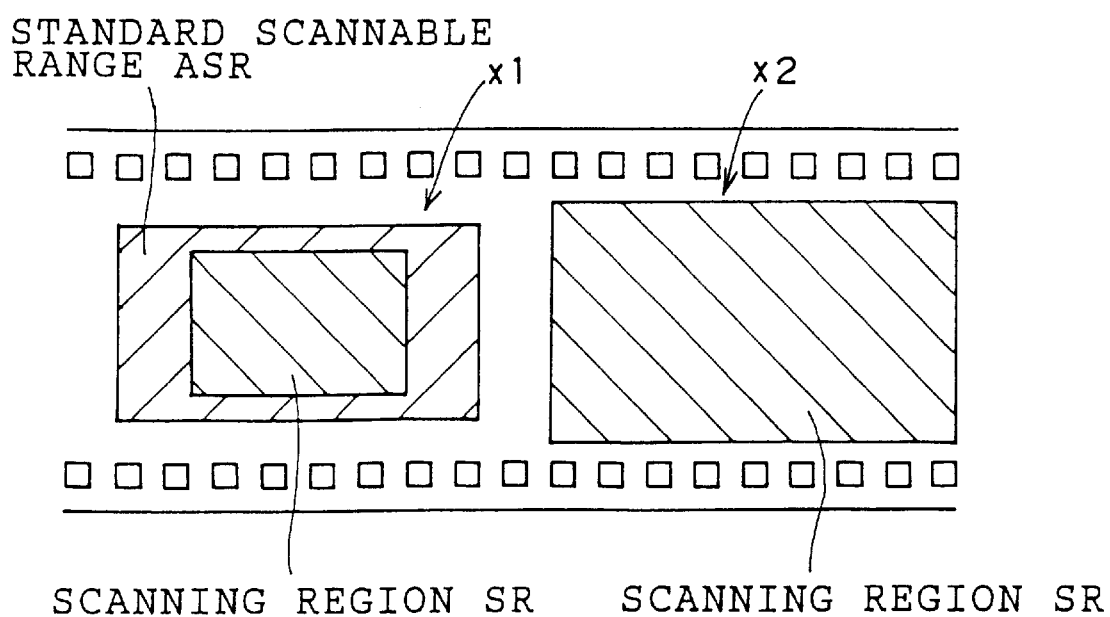

The print magnification fine adjustment is a function capable of changing the print magnification freely and its processing is carried out in the same manner as trimming processing. In this case, as indicated by a sign x2 of FIG. 18, the scanning region SR can extrude from the standard scannable range. A sign x1 of FIG. 18 indicates an example in which the scanning region does not extrude from the standard scannable range ASR.

If necessary information is input in this manner, fine scanning condition is computed at step 114.

Figure 9:
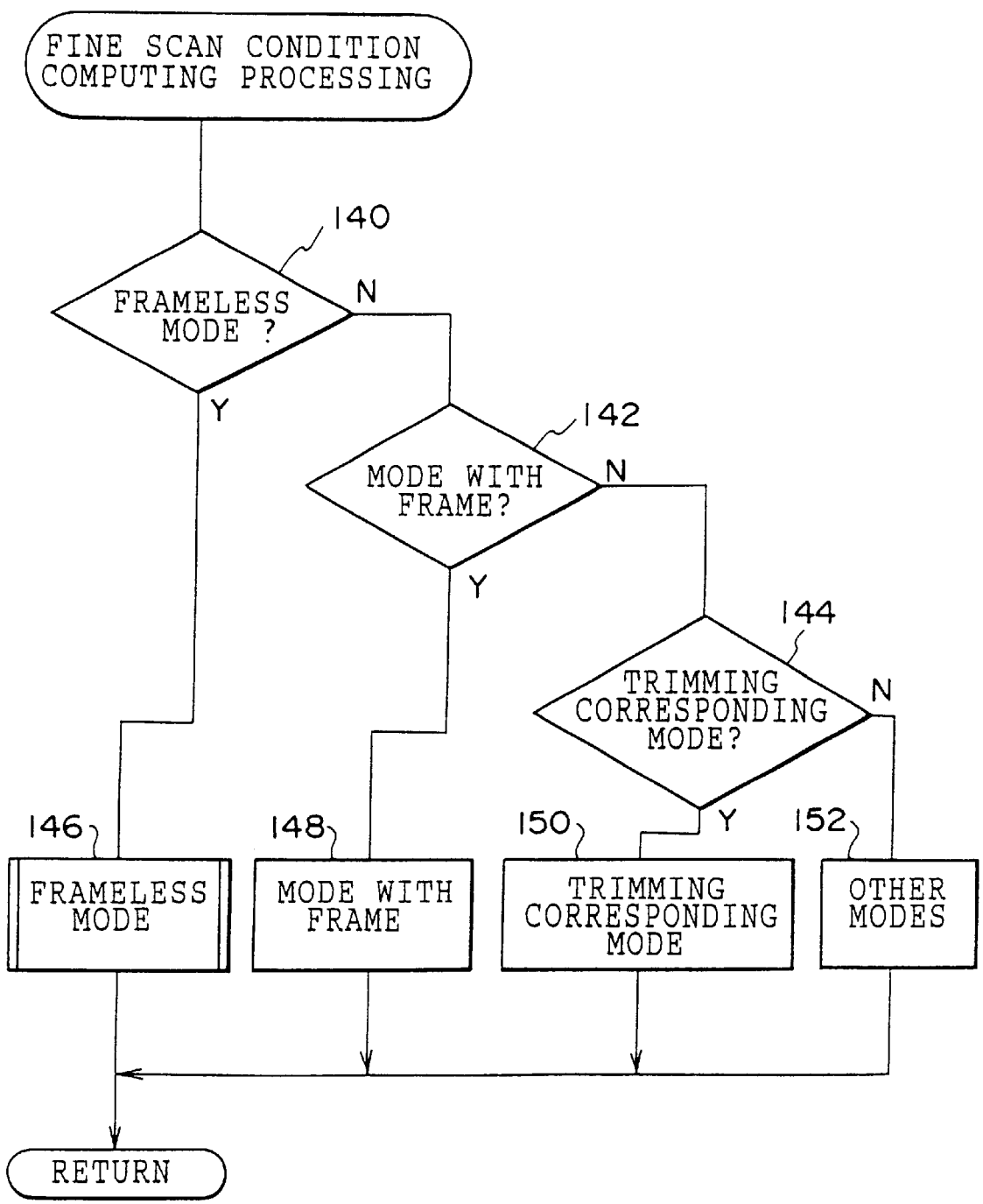
FIG. 9 is a flow chart showing a fine scan conditions computation processing routine.

The fine scanning condition computation condition will be described with reference to the fine scanning condition processing routine shown in FIG. 9.

At step 140, whether or not frameless mode is used is determined depending on the type of a specified print (whether or not the frame is provided). In case of frameless mode, frameless mode processing is carried out at step 146 and if the frameless mode is applied, whether or not mode with frame is applied is determined at step 142. If it is mode with frame, a processing on mode with frame is carried out at step 148. If it is not mode with frame, whether or not trimming corresponding mode is applied is determined at step 144. If it is trimming corresponding mode, trimming corresponding mode processing is carried out at step 150. If it is not trimming corresponding mode, the other mode is executed at step 152.

Figure 10:
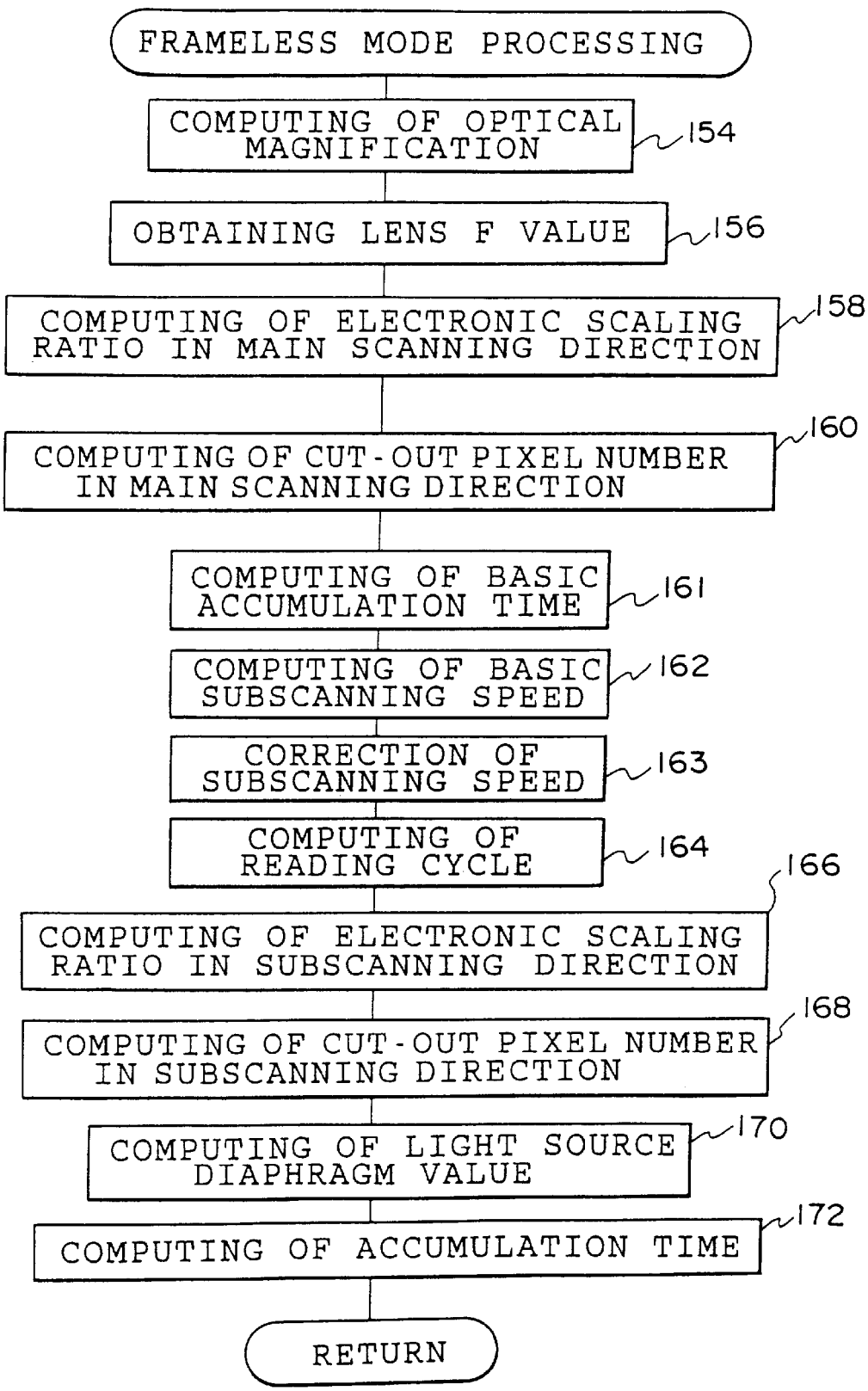
FIG. 10 is a flow chart showing frameless mode processing routine.

Next, the frameless mode processing will be described with reference to the frameless mode processing routine shown in FIG. 10.

At step 154, optical magnification MO is computed.

That is, first, temporary optical magnification MO1 in case where the electronic scaling ratio is 100% is computed in the following formula:

$$MO1 = MP \div \gamma$$

where MP is the aforementioned print magnification and γ is a size ratio between a pixel of output side and a pixel of input side.

γ=output size $P_o$÷input size $P_{ccd}$=(25.4÷300)÷0.008=10.583

The optical magnification is used for a limited position.

Because the electronic scaling ratio is desired to be smaller than 100% from viewpoint of preventing an occurrence of moir or the like, the optical magnification is set to be relatively large.

The optical magnification is selected from the temporary optical magnification MO1 according to Table shown in Table 6.

TABLE 6

| Carrier type | Film size | Determining condition | Optical magnification (MO) |
|---|---|---|---|
| 135AFC | 135F | MO1 ≦ 0.45 | 0.6 |
| | (Panorama mixed.) | 0.45 < MO1 ≦ 0.7 | 0.8 |
| | | 0.7 < MO1 | 1.2 |
| | 135P | MO1 ≦ 0.8 | 0.6 |
| | 135F | 0.8 < MO1 ≦ 1.0 | 0.8 |
| | (Panorama not mixed.) | 1.0 < MO1 | 1.2 |
| | 135HV | MO1 ≦ 0.6 | 0.6 |
| | | 0.6 < MO1 ≦ 0.8 | 0.8 |
| | | 0.8 < MO1 | 1.2 |
| | 135H | MO1 ≦ 0.85 | 0.8 |
| | | 0.85 < MO1 | 1.2 |
| 240AFC | 240 (C) | MO1 ≦ 0.6 | 0.8 |
| | 240 (H) | 0.6 < MO1 ≦ 0.9 | 1.0 |
| | | 0.9 < MO1 | 1.3 |
| | 240 (P) | MO1 ≦ 0.94 | 0.8 |
| | | 0.94 < MO1 ≦ 1.1 | 1.0 |
| | | 1.1 < MO1 | 1.3 |

Panorama mixed mentioned here means that panorama and other sizes coexist in a photographic film. Whether or not panorama size is applied is not determined until print specification is carried out by operator's verifying operation. Thus, it is not possible to determine whether or not panorama coexists until fine scanning for a first frame is started. Therefore, there is a case in which processing for not mixed is carried out halfway of that frame and then processing for mixed is started from that halfway.

At step 156, a diaphragm value (lens F value) corresponding to the optical magnification MO is obtained from Table shown in Table 7.

TABLE 7

| Carrier type | Optical magnification (MO) | LF |
|---|---|---|
| 135AFC | 0.6 | 2.0 |
| | 0.8 | 2.8 |
| | 1.2 | 4.0 |
| 240AFC | 0.8 | 2.0 |
| | 1.0 | 2.8 |
| | 1.3 | 4.0 |

At step 158, the electronic scaling ratio MEh in the main scaling direction is computed in the following formula.

$$MEh = MP \div MO \div \gamma$$

At step 160, cut-out pixel number for the main scanning direction is computed.

That is, first, print internal pixel PPh is obtained in the following formula.

$$PPh = PSh \div P_o$$

Here, PSh is a print image size corresponding to the main scanning direction and obtained from a relation between a long side and a short side of the print and photographic film. The print image size is defined as the size of an image to be scanned. That is, in case of frameless print, this is a value plus vignetting. In case of print with frame which will be described later, this is a value minus a frame portion.

By dividing the print internal pixel PPh by the electronic scaling ratio MEh, the cut-out pixel number IPh in the main scanning direction is obtained.

$$IPh = PPh \div MEh$$

At step 161, a basic accumulation time is obtained corresponding to the optical magnification MO according to Table shown in Table 8.

TABLE 8

| Carrier type | Optical magnification (MO) | ET |
|---|---|---|
| 135AFC | 0.6 | 0.422 |
| | 0.8 | 0.524 |
| | 1.2 | 1.009 |
| 240AFC | 0.8 | 0.534 |
| | 1.0 | 0.647 |
| | 1.3 | 1.103 |

At step 162, a subscanning speed (transporting speed of the photographic film) in case where the electronic scaling ratio is 100% is obtained. That is, because the length of a line on the photographic film corresponding to a line on the print is $P_o \div MP$ and the time for reading this is ET, the subscanning speed CSF1 is, $$CSF1 = (P_o \div MP) \div ET \times 1000.$$

Then, a basic subscanning speed CSF is selected from subscanning speed selection table shown in Table 9.

TABLE 9

< Subscanning speed selection table >

| Carrier type | Determining condition | Basic subscanning speed (CSF) |
|---|---|---|
| 135AFC | 32.5 ≦ CSF1 | 32.5 |
| | 24.7 ≦ CSF1 < 32.5 | 24.7 |
| | 15.0 ≦ CSF1 < 24.7 | 15.0 |
| | 10.0 ≦ CSF1 < 15.0 | 10.0 |
| | 7.0 ≦ CSF1 < 10.0 | 7.0 |
| | 5.5 ≦ CSF1 < 7.0 | 5.5 |
| | 3.0 ≦ CSF1 < 5.5 | 3.0 |
| | CSF1 < 3.0 | 2.5 |
| 240AFC | 20.0 ≦ CSF1 | 20.0 |
| (C, H) | 10.0 ≦ CSF1 < 20.0 | 10.0 |
| | 6.5 ≦ CSF1 < 10.0 | 6.5 |
| | 4.5 ≦ CSF1 < 6.5 | 4.5 |
| | 3.0 ≦ CSF1 < 4.5 | 3.0 |
| | CSF1 < 3.0 | 2.0 |
| 240AFC | 15.0 ≦ CSF1 | 20.0 |
| (P) | 8.0 ≦ CSF1 < 15.0 | 10.0 |
| | 5.8 ≦ CSF1 < 8.0 | 6.5 |
| | 4.0 ≦ CSF1 < 5.8 | 4.5 |
| | 3.0 ≦ CSF1 < 4.0 | 3.0 |
| | CSF1 < 3.0 | 2.0 |

The basic subscanning speed CSF is below a upper limit value of Table 10.

TABLE 10

| Carrier type | Film size | Optical magnification (MO) | CSF upper limit value |
|---|---|---|---|
| 135AFC | 135F | 0.6 | None |
|  |  | 0.8 | 15.0 |
|  |  | 1.2 | 7.0 |
|  | 135P | 0.6 | 24.7 |
|  |  | 0.8 | 10.0 |
|  |  | 1.2 | 7.0 |
|  | 135HV | 0.6 | 24.7 |
|  |  | 0.8 | 10.0 |
|  |  | 1.2 | 7.0 |
|  | 135H | 0.8 | 10.0 |
|  |  | 1.2 | 7.0 |
| 240AFC | 240 (C) | 0.8 | None |
|  | 240 (H) | 1.0 | 10.0 |
|  |  | 1.3 | 6.5 |
|  | 240 (P) | 0.8 | None |
|  |  | 1.0 | 10.0 |
|  |  | 1.3 | 6.5 |

At step 164, a reading cycle RC is computed in the following formula.

$$RC = ET \times CSF1 \div CSK \times 0.9$$

In case where the reading density is below 1600 dpi, the reading cycle is set to a value which attains 1600 dpi in viewpoints of picture quality. That is, $$25.4 \div (CSk \times RC \div 1000) < 1600$$

that is, in case of $RC > 25.4 \div CDk \times 1000 \div 1600$, $$RC = 25.4 \div CSk \times 1000 \div 1600.$$

If the computed reading cycle RC is below 0.422, RC=0.422.

Because the reading cycle must be over a time for writing into FM of a line, if RC<FM writing time, RC=FM writing time.

The FM writing time is obtained in the following formula. A fourth digit below zero is rounded off and a stabilization coefficient of 1.1 is multiplied. That is,

---

FM writing time
 = PPh ÷ (FM writing speed) × (stabilization coefficient)
 = PPh ÷ 4000 (pixel/msec) × 1.1.

---

An index memory writing speed does not have to be considered because in this embodiment, it is guaranteed in hardware.

At step 166, an electronic magnification in the subscanning direction is computed. That is, the line interval of the input side is CSk×RC÷1000 [mm] and the electronic magnification MEv in the subscanning direction is computed in the following formula. Meantime, because the electronic magnification MEv is set up in the unit of 0.1%, a fourth digit below zero is rounded up.

$$MEv = MP \div (P_o \div (CSk \times RC \div 1000))$$

At step 168, the cut-out pixel number in the subscanning direction is computed. That is, first, print internal pixel PPv is computed in the following formula.

$$PPv = PSv \div P_o$$

Then, by dividing the print internal pixel PPv by the electronic magnification MEv in the subscanning direction, the cut-out pixel number IPv in the subscanning direction is computed. That is, $$IPv = PPv \div Mev.$$

At step 170, a light source diaphragm value is computed. Maximum light amount (density) as a result of setup operation is assumed to be $D_{xr}$, $D_{xg}$ and $D_{xb}$. Apparatus light amount (density) corresponding to the basic accumulation time obtained by bright correction is assumed to be $D_{fr}$, $D_{fg}$, and $D_{fb}$. The apparatus light amount (density) corresponding to the reading cycle is as follows, where a fourth digit below zero is rounded up.

$$D_{fr}1 = D_{fr} \times RC \div ET$$

$$D_{fg}1 = D_{fg} \times RC \div ET$$

$$D_{fb}1 = D_{fb} \times RC \div ET$$

The adjusted light amount (density) $D_{vo1}$ is computed in the following formula.

$$D_{vo1} = MIN(D_{fr}1 - D_{xr}, D_{fg}1 - D_{xg}, D_{fb}1 - D_{xb})$$

Then, the light source diaphragm value is obtained from Table shown in Table 11.

TABLE 11

| Determining condition | Light source diaphragm amount (D cnt) |
|---|---|
| D vol < 0.3 | 0.0 |
| 0.3 ≦ D vol < 0.6 | 0.3 |
| 0.6 ≦ D vol < 0.9 | 0.6 |
| 0.9 ≦ D vol | 0.9 |

At step 172, the accumulation time is computed. That is, practical values Dvr, Dvg, Dvb of respective colors corresponding to the light source diaphragm value $D_{CNT}$ are obtained from the aforementioned diaphragm table. Then, the respective accumulation times EThr, EThg, EThb are obtained in the following formula.

$$EThr = RC \times (-\log(D_{vo1} - D_{CNT} + Dvr - D_{CNT}))$$

$$EThg = RC \times (-\log(D_{vo1} - D_{CNT} + Dvg - D_{CNT}))$$

$$EThb = RC \times (-\log(D_{vo1} - D_{CNT} + Dvb - D_{CNT}))$$

Here, if the accumulation time exceeds the reading cycle, it is forcibly set to the reading cycle. That is, if $EThr > RC$, $EThr = RC$ if $EThg > RC$, $EThg = RC$ if $EThb > RC$, $EThb = RC$.

If $D_{fb} - D_{xb} < -0.5$, the B gain is set to three times.

By the fine scan condition computation processing, an optical magnification corresponding to the print magnification, a lens F value corresponding to this optical magnification, cut-out pixel number corresponding to an electronic scaling ratio (for both the main scanning direction and subscanning direction) obtained from the print magnification and optical magnification, a basic accumulation time corresponding to the optical magnification, a basic subscanning speed corresponding to the print magnification and basic accumulation time, a reading cycle corresponding to the basic accumulation time and basic subscanning speed, a light source diaphragm value corresponding to an adjusted light amount (density) obtained by considering the basic accumulation time, reading cycle, and the like are obtained. That is, fine scan condition is computed corresponding to the print magnification.

Hereinafter, a typical computation result on frameless mode (case where 134AFC is loaded) will be described.

```
MP = 3.880
MO1 = MP ÷ γ = 3.880÷10.583=0.366
optical magnification = 0.6
electronic scaling ratio in the main scanning direction
               = MP÷MO÷γ
               = 3.880÷0.6÷10.583
               = 0.612
print internal pixel PPh = PSh÷P₀
               = (89+2.5) ÷0.08467
               = 1080
cut-out pixel number in the main scanning direction IPh
               = PPh÷MEh
               = 1080÷0.612
               = 1764
basic accumulation time ET = 0.422
subscanning speed CSF1
               = (P₀÷MP) ÷ET × 1000
               = (0.08467÷3.880) ÷0.422× 1000
               = 51.8
basic subscanning speed CSF = 32.5
reading cycle RC = ET × CSF1÷CSk × 0.9
        = 0.422×51.8÷32.5×0.9
        = 0.605
reading cycle RC = 25.4÷32.5×1000÷1600
        = 0.488
FM writing time = PPh÷4÷1000×1.1
        = 1080÷4÷1000× 1.1
        = 0.297
electronic scaling ratio MEv in subscanning direction
        =MP ÷ (P₀ ÷ (CFS×RC÷1000))
        = 3.880 ÷ (0.08467 ÷ (32.5 × 0.488 × 1000))
        = 0.727
print internal pixel PPv = PSv ÷ P₀
               = (127+2.5) ÷0.08467
               = 1529
cut-out pixel number IPv in main scanning direction
               = PPv÷MEv
               = 1529÷0.727
               = 2103
LC1 = 96 ÷ CSk ÷MO÷RC
    = 96 ÷ 32.5 ÷ 0.6 ÷0.488
    = 10.088
LCa = 10
LCb = 0.088
```

The above described processing is frameless mode processing. Because the mode with frame at step 148 and trimming mode at step 150 compute fine scan condition substantially in the same manner as the above case, a detailed description is omitted and only a different portion will be described.

In case of a processing on mode with frame, only the following two items have to be changed in the frameless mode processing.

That is, the first item is print speed.

As described above, the print size on mode with frame is a length obtained by subtracting a frame amount from a finish size.

For example, assuming that print size PSz=89 mm, PSy=127 mm, frame amount Fh=4 mm, Fv=4 mm(single side), a computed print size is PSh=PSx−2×Fh=81 mm, PSv=PSy−2×Fv=119 mm.

The second item is output vignetting amount. That is, such factors as paper meandering, cutting deflection and the like (Ox, Oy) are 0.

In case of trimming mode processing, an optical magnification is set with precedence based on a print magnification obtained by trimming operation and the electronic magnification is suppressed to as small as possible. The other processing is equal to how to obtain fine scan condition for the frameless mode processing. For example, in case of 135AFC, it is set to any one of 0.6, 0.8, 1.0, 1.2 and 1.3. However, if the print magnification is quite large (over about 20 times) like a case for super enlargement or case where the trimming ratio is too large, there is no restriction on picture quality although the print is enabled.

The basic accumulation time for other size combinations than the frameless mode processing in case where 135AFC is loaded is computed with reference to the basic accumulation time of the frameless mode processing (case where 135AFC is loaded).

That is, corresponding to the optical magnification MO, a lens F value is obtained from a lens diaphragm table shown in Table 12.

TABLE 12

| < Example of 135AFC > | |
| --- | --- |
| Optical magnification (MO) | LF |
| 0.6 | 2.0 |
| 0.8 | 2.8 |
| 1.2 | 4.0 |

Because the light amount changes depending on mirror box type, the following coefficient (MB) is obtained from Table shown in Table 13 depending on the mirror box type.

TABLE 13

| Mirror box type | For 135F and lower | For 120 |
| --- | --- | --- |
| Coefficient (MB) | 1 | 0.4 |

The basic accumulation time is computed as follows using the above three types of parameters.

$$ET1=ET0\times(LF\times(1+MO))^2 \div (LF0\times(1+MO0))^2 \div MB$$

Here, in the above frameless mode processing, LF0=2.0, MO0=0.6.

A light amount allowance is obtained corresponding to the optical magnification from Table shown in Table 14.

TABLE 14

| Optical magnification (MO) | Light amount allowance (KY) |
| --- | --- |
| 0.6 | 1.20 |
| 0.8 | 0.95 |
| 1.2 | 0.95 |

The basic accumulation time is computed as follows.

$$ET=(ET1 \div 10^{(KY0-KY)*1000}) \div 1000$$

where KY0=1.20.

After the fine scan condition is computed as described above, at step 116 (see FIG. 7), whether or not it is necessary to move to high density reading mode is determined. That is, whether or not an image can be read appropriately if the fine scan is executed under the aforementioned fine scan condition is determined. For example, if although the photographic film is carried at the aforementioned basic subscanning speed, the light source diaphragm is controlled corresponding to the aforementioned light source diaphragm value and the light amount is accumulated in the aforementioned accumulation time, the density of the photographic film image is over a predetermined value and an image cannot be read appropriately, the high density reading mode is executed at step 118. If an image can be read appropriately, fine scan is executed under the fine scan condition at step 120. That is, by transporting the photographic film 22 carried up to a front end for prescan, in an opposite direction to the prescan, every frame of an image recorded on the photographic film 22 is fine-scanned on the photographic film at an optimum exposure condition (the aforementioned fine scan condition). That is, respective portions (film carrier, reading section driving motor 58, lens driving motor 60, diaphragm driving motor 56, CCD line sensor 116 and the like) are controlled so as to ensure the aforementioned fine scan condition.

Next, the high density reading mode will be described with reference to the high density reading mode processing routine shown in FIG. 11. Although the description below is about 135AFC, the same processing is carried out in the other cases.

Figure 11:
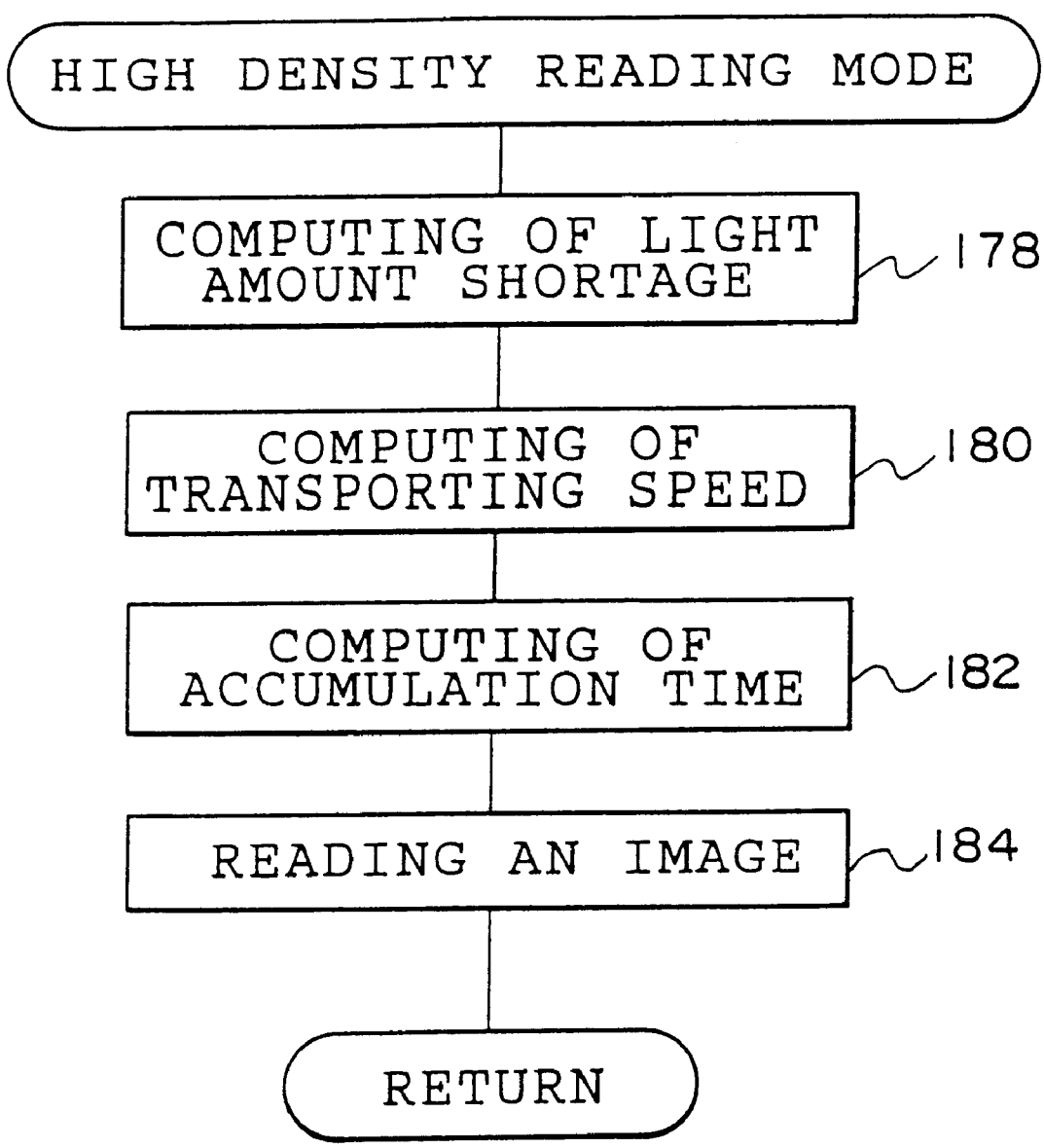
FIG. 11 is a flow chart showing a high density reading mode processing routine.

A shortage of the light amount is computed at step 178 of FIG. 11. Assuming that a correction amount by setup operation is $D_s$ and a correction allowance at prescan time (light source diaphragm position) is $D_y$, the shortage of light amount Dh is Dh=$D_s$−$D_y$. For example, assuming that Ds=0.7, Dy=0.3, the shortage Dh is, $$Dh=Ds-Dy=0.4.$$

At step 180, transporting speed is computed. That is, assuming that transporting speed on normal mode is CSf=32.5 mm/sec, necessary transporting speed CSk1 is $$CSk1 = CSf \times (-\log(Dh))$$
$$= 32.5 \times (-\log(0.4))$$
$$= 12.93.$$

Then, a maximum value (mm/sec) not exceeding CSk1 is selected from the following numeral group.

32.5/24.7/15/10/7/5.5/3/2.5

In this case, CSk=10 mm/sec.

At step 182, the accumulation time is computed. That is, if the accumulation time ET on mode with frame is ET=0.422 msec, necessary accumulation time ETk is $$ETk = et \times CSf \div CSk$$
$$= 0.422 \times 32.5 \div 10$$
$$= 1.372 \text{ msec.}$$

At step 184, the photographic film is carried at the above computed transporting speed and the light amount is accumulated at the above computed accumulation time so as to read an image.

An image signal read in the above manner is amplified by the amplifier 76 and converted to digital data (image data) by the A/D converter 82.

Figure 27:
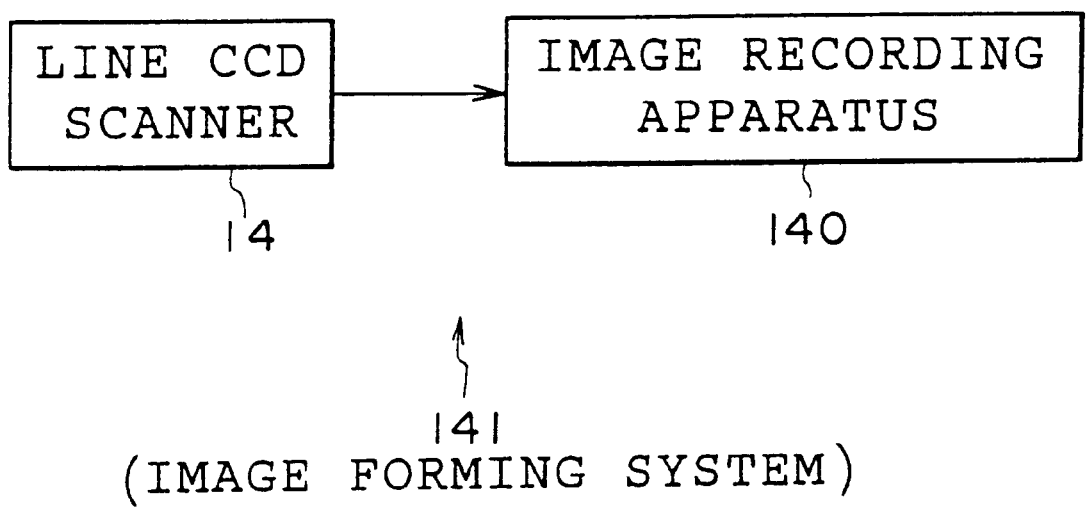
FIG. 27 is a block diagram showing an image forming system.

In the above image data, deflection of lines (coloring deflection) along the main scanning direction read by three line CCDs 116 is corrected and then the image data is input to the image processing section 16 through the interface (I/F) circuit 90. The image data is converted to a predetermined pixel number by an enlargement/reduction circuit (not shown) of the image processing circuit 16 so as to obtain a final image data this image data is transported to an image recording apparatus 140 (see FIG. 27) in which the image is transferred to a photographic paper by scanning exposure. Then, by development processing, a desired photographic print is obtained. That is, an image forming system is composed of the line CCD scanner 14 and the image recording apparatus 140.

Figure 19:
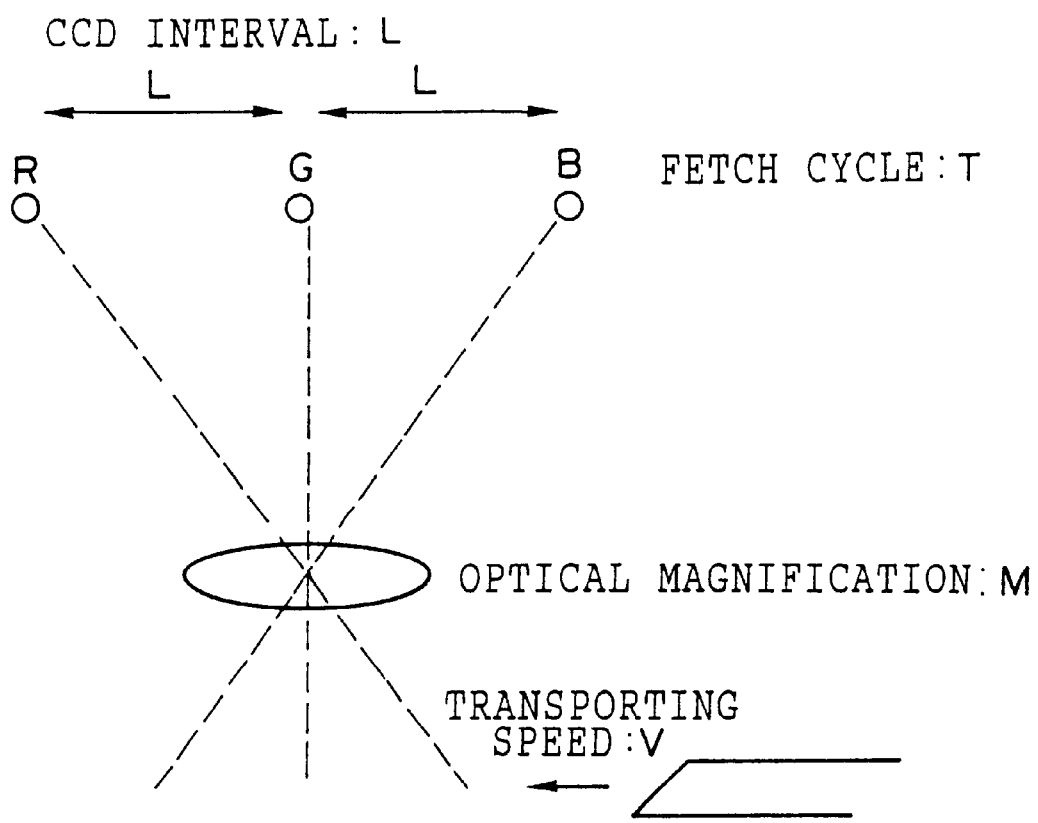
FIG. 19 is a diagram showing the disposition of CCD sensors for red, green and blue.

Next, correction for the aforementioned coloring deflection will be described in detail. FIG. 19 shows an allocation of a case of prescan for 135AFC and 240AFC (MFC fine scan).

Figure 20:
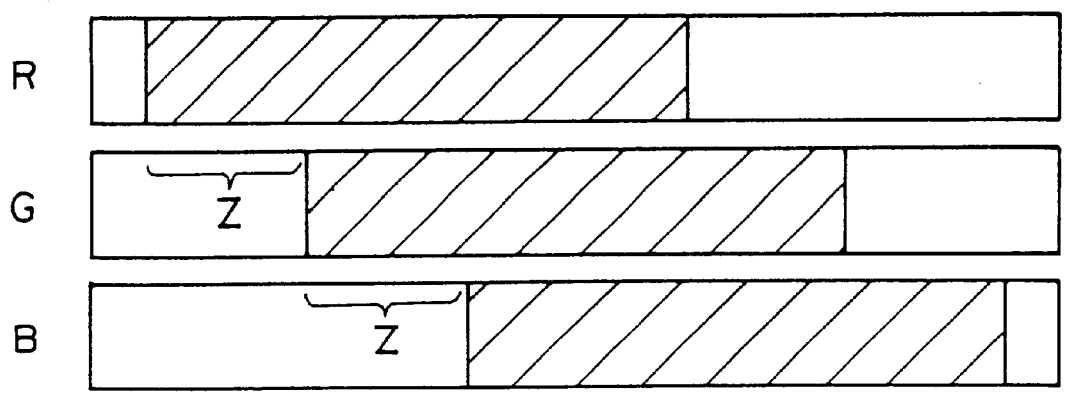
FIG. 20 is a conceptual view showing the image data of each CCD line sensor when color misregistration correction is not carried out.

An image obtained when no correction on coloring deflection is carried out is as indicated in FIG. 20. That is, a deflection amount Z of each color is expressed in the following formula:

$$Z=L \div (V \times M) \div T$$

where it is assumed that a number obtained by rounding up a first digit below zero is a (a is an integer) and Z−a=b (b is a decimal value).

As described above, correction for the unit of line is carried out by the CDS 88. A line correction amount (for red, green, and blue) to be set by the CDS 88 is as shown in Table 15.

TABLE 15

|  | Prescan | Fine scan |
|---|---|---|
| 135AFC, 240AFC | (2 × a, a, 0) | (0, a, 2 × a) |
| MFC | (0, a, 2 × a) | (2 × a, a, 0) |

Figure 21:
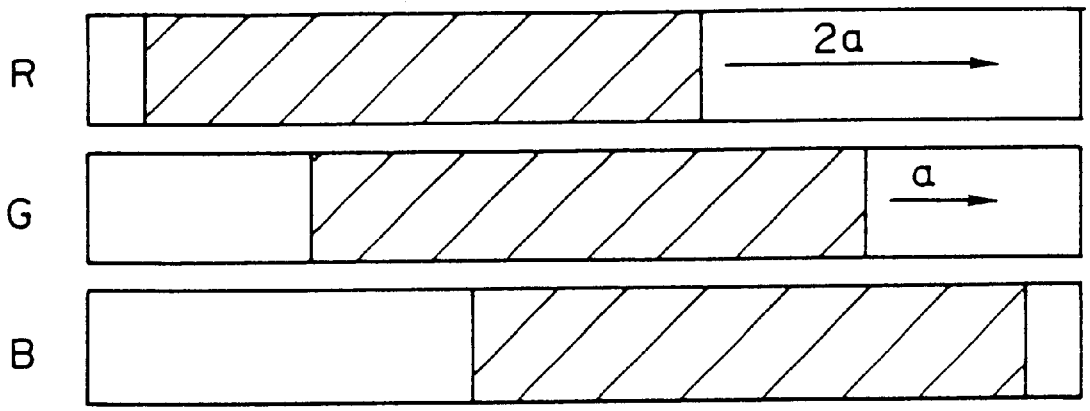
FIG. 21 is a diagram showing a condition for correcting the color misregistration in units of one line.

As shown in FIG. 21, the reading timing for red image data is delayed by 2a and the reading timing for green image data is delayed by a.

Next, a decimal portion is corrected by an enlargement/reduction circuit (not shown) in the image processing section 16.

That is, the correction amounts (for red, green, and blue) to be set in the enlargement/reduction circuit are as shown in Table 16.

TABLE 16

|  | Prescan | Fine scan |
|---|---|---|
| 135AFC, 240AFC | (b, 0, −b) | (−b, 0, b) |
| MFC | (−b, 0, b) | (b, 0, −b) |

In the hardware, a value based on $\frac{1}{16}$ pixel is set up in its register.

Figure 22:
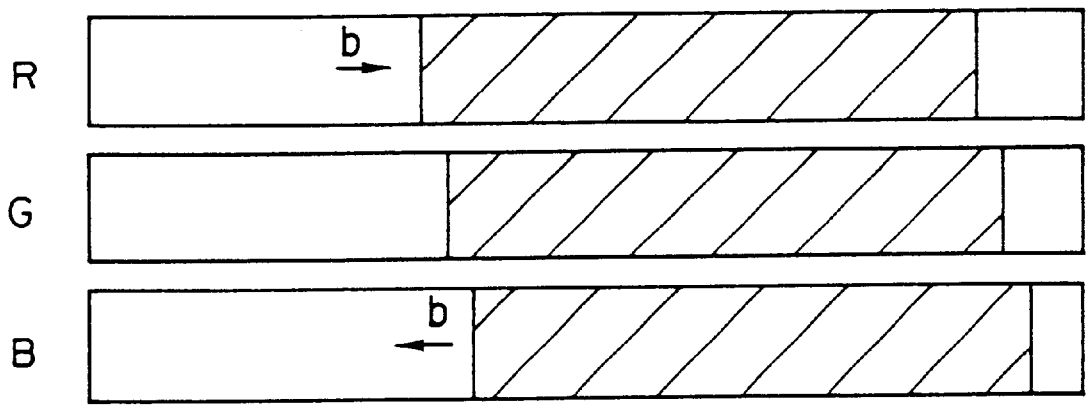
FIG. 22 is a diagram showing a condition for correcting a color misregistration smaller than a single pixel.

As a result, as shown in FIG. 22, the reading timing for red image data is delayed by b and the reading timing for blue image data is quickened by b.

Figure 23:
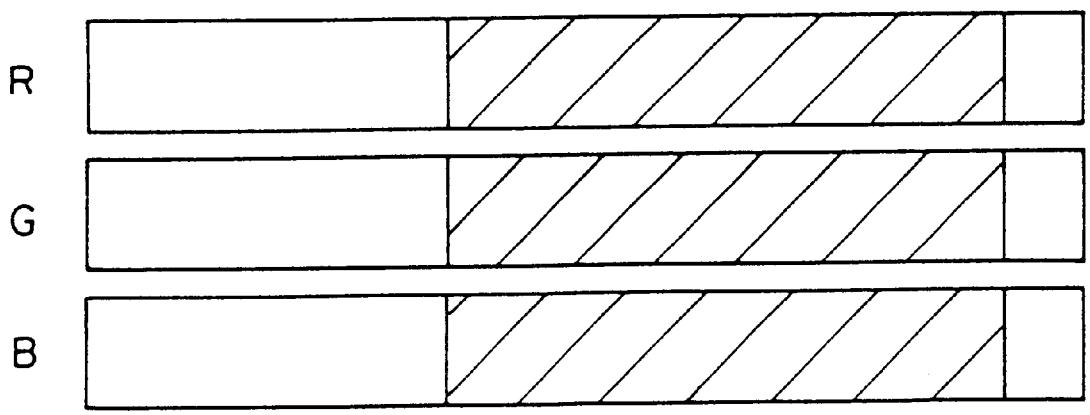
FIG. 23 is a conceptual diagram showing the image data of each CCD line sensor after color misregistration is corrected.
Figure 24:
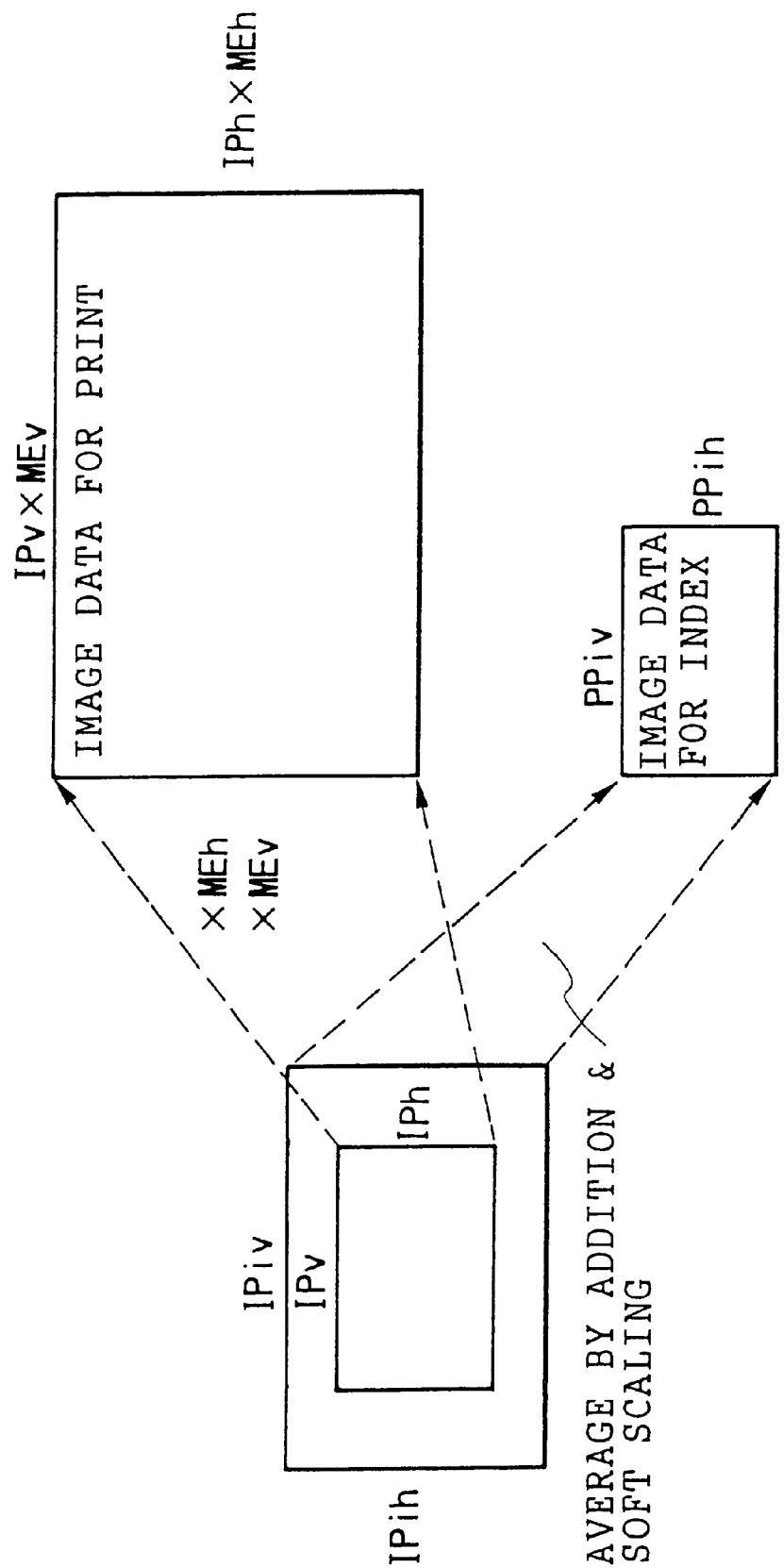
FIG. 24 is a conceptual diagram of the image data of an index print.

As a result, as shown in FIG. 23, the coloring deflection is corrected within $\frac{1}{16}$ pixel.

Although the coloring deflection to be carried out in the scanner portion is executed by the hardware, green part correction must be less than 24 lines (for red and blue, for example 48 lines) for the reason of its restraint. That is, a<24 must be established. Unless this relation is established, algorithm or hardware specification is corrected so as to achieve the establishment.

Next, the index print will be described. The print magnification of a frame image in the index print is processed in the same manner as the aforementioned print with frame. However, there is no concept about the print magnification fine adjustment and trimming, and print is always made at the standard print magnification. Further, the index print is not affected by main print size or print magnification.

For example, in case of 135 size photographic film, a short side and a long side of a frame image on the index print are assumed to be $P_x$ and $P_y$. The standard scannable range is 23.6 mm×34.8 mm.

The print magnification is obtained in the following formula.

$$MAX(P_y/34.8, P_x/23.6)$$

The index print image size is $PS_{ih}$ for the main scanning direction and $PS_{iv}$ for the subscanning direction. The index print pixel number is expressed by the following formula (a portion below the decimal point is rounded off).

$$PP_{ih}=PS_{ih} \div P_o \quad PP_{iv}=PS_{iv} \div P_o$$

The index print magnification is assumed to be MPi. The cut-out pixel number $IP_{ih}$ in the main scanning direction is expressed in the following formula (a portion below the decimal point is rounded off).

$$IP_{ih}=PS_{ih} \div MPi \times MO \div 0.008$$

The cut-out pixel number in the subscanning direction is expressed in the following formula (a portion below the decimal point is rounded off).

$$IP_{iv}=PS_{iv} \div MPi \div CSk \div RC$$

If the cut-out pixel number for index is larger than the cut-out pixel number for the main print, up to a size for index is cut out by the scanner portion and then only an area necessary for the main print is cut out by the image processing section. Conversely, if the cut-out pixel number for index is smaller than the cut-out pixel number for the main print, up to a size for the main print is cut out by the scanner portion and then up to a size for index is cut out by the PC portion software.

Next, verification processing on algorithm will be described. In this algorithm verification processing, whether or not reading of the photographic film image is completed appropriately is determined based on the aforementioned fine scan condition, and if it is determined that the reading is not completed appropriately, error indication is carried out. The following verification processing is executed every predetermined time.

[Electronic Scaling Ratio]

There is established a relation shown in Table 17 between the electronic scaling ratio in the main scanning direction and subscanning direction computed by the above processing and the picture quality MTF.

TABLE 17

| Electronic scaling ratio in the main scanning direction (MEh) | Electronic scaling ratio in the subscanning direction (MEv) | MTF | Moire |
|---|---|---|---|
| MEh < 95% | MEv < 95% | ○ | ○ |
| 95% ≦ MEh ≦ 105% | 95% ≦ MEv ≦ 105% | Δ | Δ |
| 105% < MEh ≦ 130% | 105% < MEv ≦ 120% | Δ | ○ |
| 130% < MEh | 120% < MEv | X | ○ |

○: no problem

TABLE 17-continued

| Electronic scaling ratio in the main scanning direction (MEh) | Electronic scaling ratio in the subscanning direction (MEv) | MTF | Moire |
|---|---|---|---|

Δ: avoid because there is produced a problem depending on an image
X: avoid because there is a problem in picture quality In this embodiment, the above relations are stored and whether or not a requested picture quality can be achieved is determined according to the electronic scaling ratios in the main scanning direction and subscanning direction computed in the above processing and the stored relation. If it is determined that the requested picture quality cannot be achieved, a message saying that the requested picture quality cannot be achieved is displayed on the display 18. Consequently, the specifications of the algorithm and hardware are corrected.

[Memory Capacity]

As for the pixel number of image data to be output to a printer (not shown), output pixel number (OPh) in the main scanning direction=cut-out pixel number (IPh) in the main scanning direction×electronic scaling ratio (MEh) in the main scanning direction and output pixel number (OPv) in the subscanning direction=cut-out pixel number (IPv) in the subscanning direction×electronic scaling ratio (MEv) in the subscanning direction.

The size of image data to be accumulated in the FM can be obtained in the following formula.

Sfm = (output pixel number in the main scanning direction) ×
(cut-out pixel number in the subscanning direction)
    = (OPh) × (IPv)
or
Sfm = (output pixel number in the main scanning direction) ×
(cut-out pixel number for index in the subscanning direction)
    = (OPh) × (IPiv)

A larger value of the above results is applied. Further, the size of image data to be accumulated in the TM can be obtained by the following formula.

Stm = (output pixel number in the main scanning direction) ×
(output pixel number in the subscanning direction)
    = (OPh) × (OPv)

The following determination is carried out according to this value.

Whether or not Sfm<8M(8×1024×1024) and Stm<8M is established is determined. If this relation is established, high speed processing by double buffer is enabled. If this relation is not established, whether or not Sfm<20M and Stm<16M is established is determined. If this relation is established, processing by single buffer is enabled. If this relation is not established, the processing is disabled. That message is displayed on the display 18. After that, the algorithm or hardware specification is corrected.

If the cut-out pixel number for index print is smaller than the cut-out pixel number for the main print or if a print higher than the standard print magnification is carried out, in case of the maximum print size (quarter), assuming that the electronic scaling ratio in the subscanning direction is MEv, $$Sfm = 4530 \times 3030 \div MEv \div 1024 \div 1024$$

$$= 13.1 \div MEv < 20$$

$$Sfm = 4530 \times 3030 \div 1024 \div 1024$$

$$= 13.1 < 16.$$

If MEv>0.655, the processing is not disabled. However, if a super size print is carried out at a magnification lower than the standard print magnification and the index print is generated at the same time, there sometimes occurs a case in which the FM capacity is exceeded. In this case, an error message is displayed on the display 18 and the index print and super size print are processed separately.

[Image Processing Time]

In case of 135AFC or 240AFC, a time taken for image processing of a single frame in order to process plural frames continuously needs to be less than a time taken for scanning of a single frame including soft overhead.

(image processing time for a single frame)+(soft overhead)<(scan time for a single frame)

If the above relation is not established, the transporting is stopped for every frame.

The image processing time for a single frame can be obtained in the following formula.

((output pixel number in the main scanning direction)+(main scanning pipeline number))×((output pixel number in the subscanning direction)+(subscanning pipeline number))÷(image processing speed)=(OPh+250)×(OPv×4)÷4

Soft overhead is 0.2 sec.

Scan time for a single frame can be obtained by the following formula.

(intra-frame pitch)÷(subscanning speed)

If the requested processing capacity cannot be achieved because the above relation is not established, that message is displayed on the display 18. Consequently, the algorithm or hardware specification is corrected.

Figure 25A:
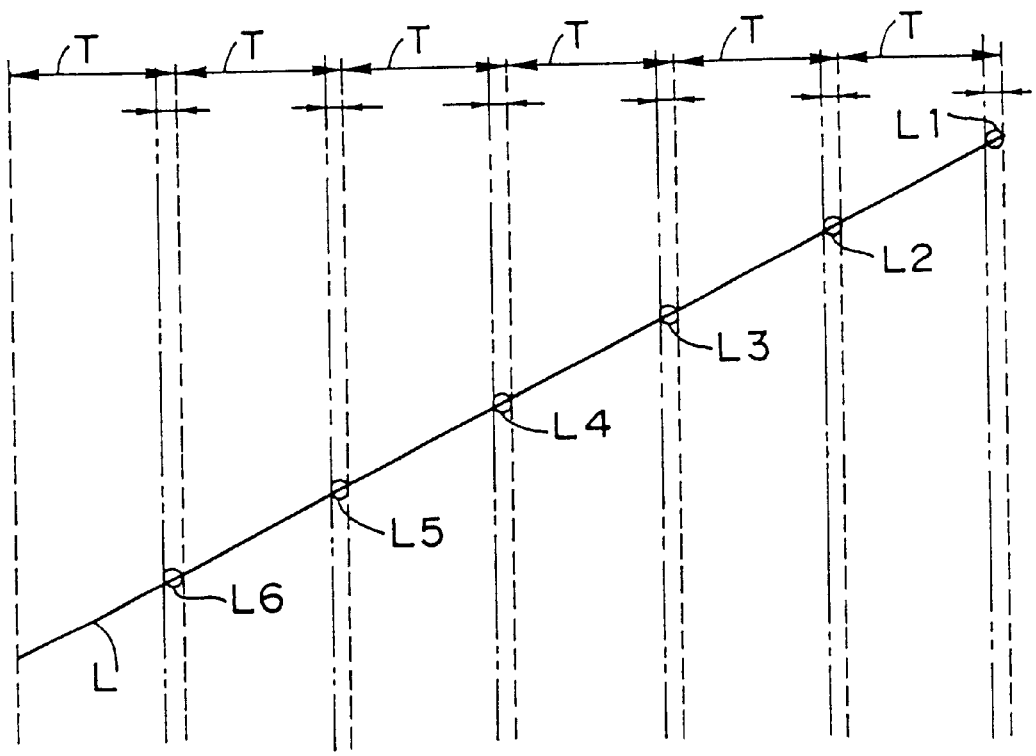
FIGS. 25A and 25B are explanatory diagrams explaining a jagged image.
Figure 25B:
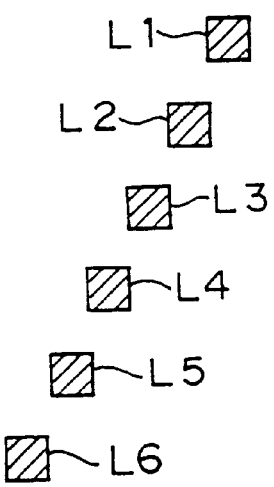

If, when an image on the photographic film is read in an accumulation time t in the reading cycle T as shown in FIG. 25A, a ratio of the accumulation time t relative to the reading cycle T is smaller than a predetermined value (for example, $\frac{1}{16}$), a read image becomes a jagged image (aliasing). That is, if a straight line L as shown in FIG. 25A is read so that the above ratio is smaller than the predetermined value, portions of the read image in each accumulation time are L1, L2, . . . . If this is printed, as shown in FIG. 25B, it is recognized as not the straight line L but intermittent images L1, L2, . . . .

Thus, according to this embodiment, the ratio of the accumulation time t with respect to the reading cycle T is set so as to be higher than the predetermined value. That is, by enforcing the diaphragm amount of the light source diaphragm to a predetermined value or reducing the light amount by using the ND filter, the accumulation time is prolonged correspondingly, so that the above ratio is set to be higher than the predetermined value.

The turret is not restricted to the above-mentioned turret (see FIG. 4B), but may be composed of a turret 36C for cyan filter absorbing red ray, a turret 36M for magenta filter absorbing green ray, and a turret 36Y for yellow filter absorbing bluish purple ray, as shown in FIG. 26. Plural cyan filters having different densities are imposed in the turret 36C. The densities are darker in the order of cyan filters 36C1, 36C2, and 36C3. The other turrets have the same structure. The turrets 36C, 36M, 36Y are rotatably supported such that filters selected on the respective turrets overlap each other on the optical axis L.

Figure 28:
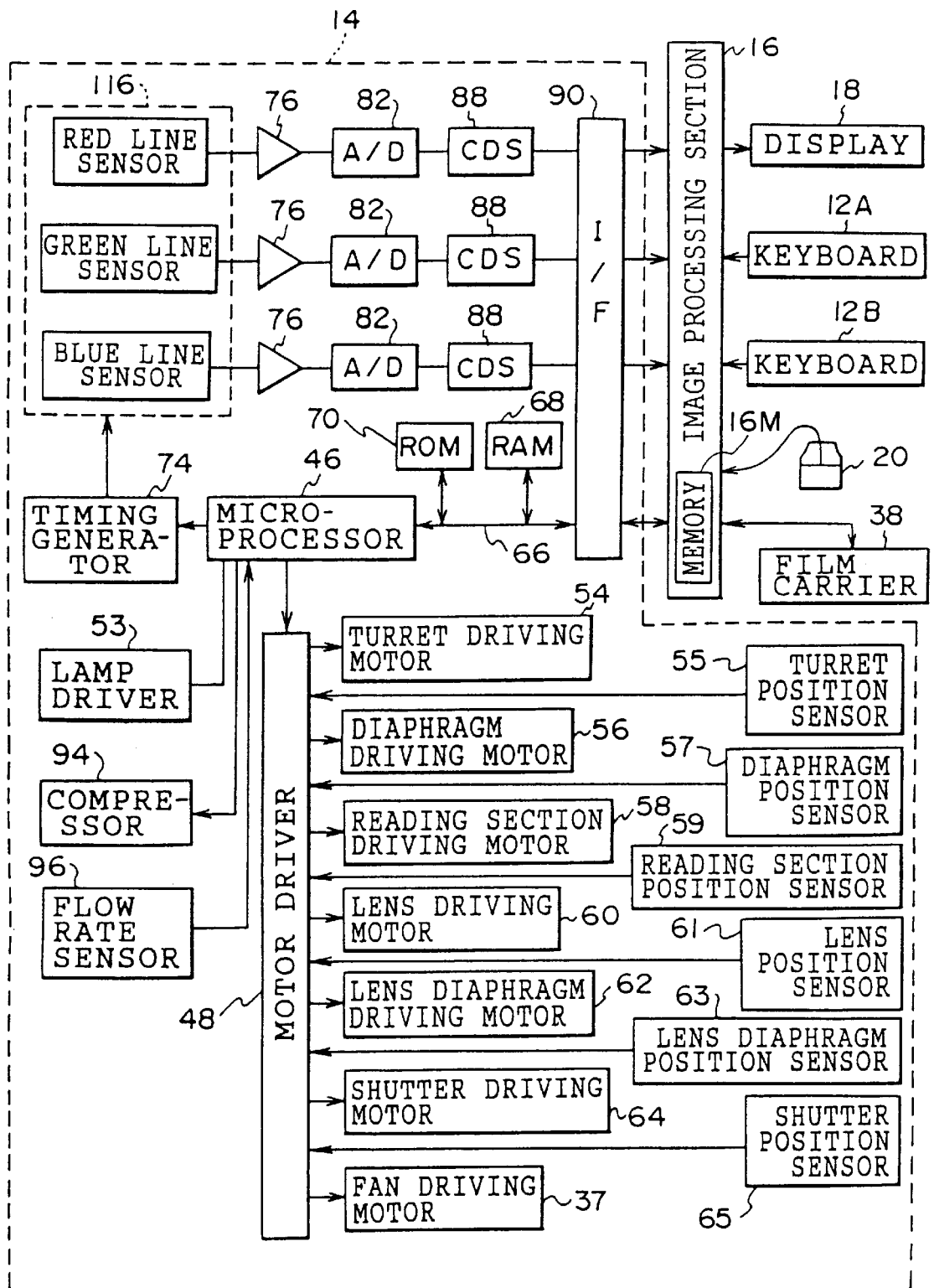
FIG. 28 is a block diagram showing a schematic structure of an electrical system of a line CCD scanner according to a second embodiment.

Next, a second embodiment of the present invention will be described. Because the structure of this embodiment is the same as the structure of the first embodiment described above, the same reference numerals are attached and a description thereof is omitted. Although not described in detail in the first embodiment, as shown in FIG. 28, the image processing section 16 is provided with a storage medium (memory) 16M for storing image data obtained by reading an image recorded on a photographic film. The memory 16M can be composed of a hard disk, CD-ROM or the like.

Next, the operation of the present embodiment will be described.

According to the present embodiment, as described later, an image recorded on the photographic film is displayed on a display unit using image data stored in the memory 16M. There are a plurality of types of resolution for displaying an image on the display unit and according to this embodiment, the image can typically be displayed in VGA and SVGA resolution. VGA has a pixel density of 640×480 and SVGA has a pixel density of 1280×1024. The above described resolutions are typical resolutions and the present invention is not restricted to these. A further, arbitrary resolution may be set.

If the film carrier 38 is loaded and a photographic film 22 is inserted into the loaded film carrier 38, the photographic film 22 is detected by a photographic film identification sensor (not shown) of the film carrier 38 and then the film carrier 38 automatically starts to transport the photographic film 22.

Figure 29:
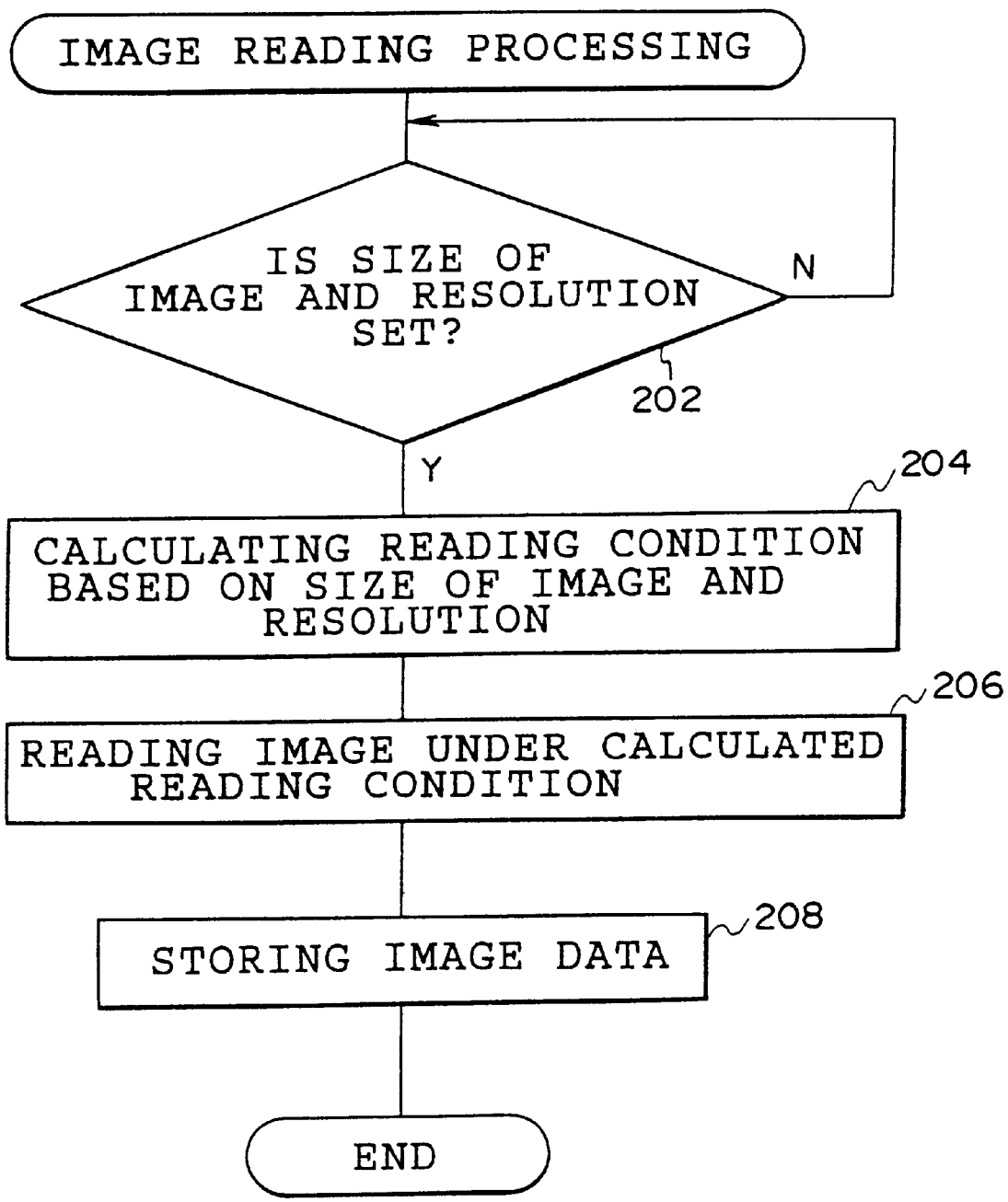
FIG. 29 is a block diagram showing an image reading processing routine of a line CCD scanner according to the second embodiment.

At the same time, the line CCD scanner 14 starts the image reading processing routine shown in FIG. 29 and in step 202, whether or not the image size and resolution are set is determined.

Here, information indicating each of a plurality of resolutions (VGA and SVGA in this embodiment, as described above) and information indicating each of a plurality of image sizes are displayed on an initial screen of the display unit 18. An operator selects a desired resolution from the plurality of displayed resolutions and an image size using the mouse or key board. If the size of the image and resolution are set in this manner, image data quantity to be stored in the memory 16M is then the substantially set. As a result, an affirmative determination is made in this step 202. In the above example, the image data quantity when VGA is selected is smaller than when the SVGA is selected.

In the next step 204, reading conditions (at least one of optical magnification, lens F number, reading pixel number, accumulation time, subscanning speed, and irradiation light volume) corresponding to a set size of an image and resolution is set. If the image data quantity is small, it is not necessary to read an image at a relatively higher precision as compared to when the image data quantity is large. The reading condition when VGA is selected is at a lower precision than when the SVGA is selected. In this embodiment, reading conditions corresponding to both VGA and SVGA are stored and in this step 204, reading conditions corresponding to the set image size and resolution are selected and set.

In step 206, an image is read under the reading conditions set as described above and in step 208, image data obtained by the above reading is stored in the memory 16M.

The order in which the image data is stored may be the order in which the image is read in the above manner or a rearranged order.

The storage format for the image data maybe, for example, JPEG or FPX. Namely, when JPEG or FPX is selected by the operator, the image data quantity stored in the above memory 16M may be set as either the image data quantity when the image data is further compressed and stored, or the image data quantity when the image data is compressed or enlarged by at least one compression or the image data or enlargement ratio, or reading conditions in accordance with these may be set. When the image data is stored in a state of compression or reduction, the image data quantity is reduced and therefore does not need to be read at high precision. When the image data is stored in a state of enlargement, the image data quantity is increased and therefore does need to be read at high precision.

Because according to this embodiment, as described above, a reading condition is calculated based on estimated image data quantity for storing the image in the memory, by reading an image recorded on a photographic film the reading condition can be optimized so that the image can be read optimally.

Although according to this embodiment, an image is displayed using image data stored in the memory, the present invention is not restricted to this and it is permissible to print the image using the image data. It is also permissible that when the resolution is low (VGA), the image data is used for display on a display unit, when the resolution is high (SVGA), the image data is used for a large size print and when the image data quantity is yet greater, it may be used for a high magnification print.

What is claimed is:

1. An image reading apparatus comprising:
   a setting device for setting a print magnification which is a ratio between the size of a portion to be read of an image recorded on a photographic photosensitive material and the size on a print surface of the read image;
   computing means for computing a reading condition for reading an image on said photographic photosensitive material on the basis of the print magnification set by said setting device; and
   a reading unit for reading an image on said photographic photosensitive material in accordance with the reading condition computed by said computation means.

2. An image reading apparatus according to claim 1 further comprising:
   a detector for detecting the type of said photographic photosensitive material; and
   an input device for inputting the size on said print surface,
   wherein said setting device sets said print magnification on the basis of the type of the photographic photosensitive material detected by said detector and the size on said print surface input by said input device.

3. An image reading apparatus according to claim 1 further comprising:
   a specifying device for specifying the size of a portion to be read of an image recorded on said photographic photosensitive material; and
   an input device for inputting the size on said print surface,
   wherein said setting device sets said print magnification on the basis of the size of a portion to be read of said image specified by said specifying device and the size on said print surface input by said input device.

4. An image reading apparatus according to claim 1 wherein said reading apparatus performs a preliminary reading and a fine reading of an image on said photographic photosensitive material and said computing means computes a reading condition for the fine reading of an image on said photographic photosensitive material.

5. An image reading apparatus according to claim 1 further comprising a transporting device for transporting said photographic film,
   wherein said reading apparatus reads said image while said photographic photosensitive material is being transported by said transporting device.

6. An image reading apparatus according to claim 1 further comprising:
   determining means for determining whether or not the reading by said reading apparatus is completed appropriately on the basis of reading condition computed by said computing means; and
   an indicating device for indicating an error if it is determined that the reading by said reading apparatus is not completed appropriately by said determining means.

7. An image reading apparatus according to claims 1 wherein said calculating means calculates at least one of optical magnification, lens F number, reading pixel number, accumulation time, subscanning speed and irradiated light volume.

8. An image reading apparatus according to claim 1 further comprising:
   determining means for determining whether or not said reading apparatus is able to read an image of said photographic photosensitive material appropriately according to the reading condition computed by said computing means; and
   correcting means for correcting said reading condition if it is determined that said reading apparatus is not able to read the image on said photographic photosensitive material appropriately by said determining means,
   wherein said reading apparatus reads the image on said photographic photosensitive material in accordance with said corrected reading condition.

9. An image reading apparatus according to claim 8 wherein said determining means determines that said reading apparatus is not able to read an image on said photographic photosensitive material appropriately if the density of an image on said photographic photosensitive material is higher than a predetermined value.

10. An image forming system comprising:
    the image reading apparatus according to claim 1; and
    an image recording apparatus for generating a photographic print on the basis of image data obtained by a reading by said image reading apparatus.

* * * * *